United States Patent
Moses et al.

(10) Patent No.: US 9,716,751 B2
(45) Date of Patent: *Jul. 25, 2017

(54) METHOD AND SYSTEM FOR SHARING WEB COMPONENTS BETWEEN WEB SITES

(71) Applicant: OPEN TEXT SA ULC, Halifax (CA)

(72) Inventors: Dean Moses, San Francisco, CA (US); Ed Anuff, San Francisco, CA (US); Fergus Griffin, San Francisco, CA (US); Jean Tessier, Foster City, CA (US); Hans Akesson, San Francisco, CA (US); John Petersen, San Francisco, CA (US); Tom Belunis, San Francisco, CA (US); Edith Harbaugh, Oakland, CA (US); Noah Guyot, San Francisco, CA (US); Dave MacLeod, Oakland, CA (US); Amy Phillips, Oakland, CA (US); Ethan Vonderweid, San Francisco, CA (US)

(73) Assignee: Open Text SA ULC, Halifax (CA)

( * ) Notice: Subject to any disclaimer, the term of this patent is extended or adjusted under 35 U.S.C. 154(b) by 535 days.

This patent is subject to a terminal disclaimer.

(21) Appl. No.: 13/847,937

(22) Filed: Mar. 20, 2013

(65) Prior Publication Data

US 2013/0227067 A1 Aug. 29, 2013

Related U.S. Application Data

(63) Continuation of application No. 10/091,513, filed on Mar. 7, 2002, now Pat. No. 8,407,353.

(Continued)

(51) Int. Cl.
*G06F 15/16* (2006.01)
*G06F 17/30* (2006.01)
(Continued)

(52) U.S. Cl.
CPC ...... *H04L 67/1095* (2013.01); *G06F 17/3089* (2013.01); *G06F 17/30893* (2013.01);
(Continued)

(58) Field of Classification Search
CPC .............. H04L 63/105; H04L 67/2838; H04L 67/1095; H04L 67/1097; G06F 17/30893
See application file for complete search history.

(56) References Cited

U.S. PATENT DOCUMENTS 5,226,161 A 7/1993 Khoyi et al.
5,708,812 A 1/1998 Van Dyke
(Continued)

FOREIGN PATENT DOCUMENTS

WO WO0029927 5/2000
WO WO0034873 6/2000
WO WO03025796 6/2002

OTHER PUBLICATIONS

Bruno, J. et al., "Pebble: A Component-Based Operating System for Embedded Applications," Proceedings of USENIX Workshop on Embedded Systems, Mar. 29-31, 1999, 11 pages, Cambridge, MA.

(Continued)

*Primary Examiner* — Aaron Strange
(74) *Attorney, Agent, or Firm* — Sprinkle IP Law Group

(57) ABSTRACT

The sharing of objects may be executed by performing various share type administrations. Objects may be shared directly to a site or may be made available indirectly for reuse by a site. The objects shared and made available for reuse may be added to the site to which they are shared and made available for reuse. References to the objects shared and made available for reuse are stored in repositories in response to, and in accordance with, the share type administration performed. The storage of the references to objects is based on privileges associated with at least one of a (Continued)

repository, a site and a user. Objects made available for reuse by, and shared to, a site may be made unavailable for reuse by, and unshared to, the site through the execution of a share type administration.

20 Claims, 13 Drawing Sheets

Related U.S. Application Data

(60) Provisional application No. 60/322,462, filed on Sep. 17, 2001.

(51) Int. Cl.
   *H04L 29/08* (2006.01)
   *G06Q 10/10* (2012.01)
   *H04L 29/06* (2006.01)
   *H04L 12/24* (2006.01)

(52) U.S. Cl.
   CPC ............. *G06Q 10/10* (2013.01); *H04L 29/06* (2013.01); *H04L 41/22* (2013.01); *H04L 63/105* (2013.01); *H04L 67/10* (2013.01); *H04L 67/1097* (2013.01); *H04L 67/2838* (2013.01); *H04L 67/306* (2013.01); *H04L 69/329* (2013.01); *H04L 41/28* (2013.01); *H04L 67/2861* (2013.01)

(56) References Cited

U.S. PATENT DOCUMENTS

| | | |
|---|---|---|
| 5,764,972 A | 6/1998 | Crouse et al. |
| 5,805,118 A | 9/1998 | Mishra et al. |
| 5,845,299 A | 12/1998 | Arora et al. |
| 5,899,996 A | 5/1999 | Dysart et al. |
| 5,900,871 A | 5/1999 | Atkin et al. |
| 5,907,326 A | 5/1999 | Atkin et al. |
| 5,918,013 A | 6/1999 | Mighdoll et al. |
| 5,950,198 A | 9/1999 | Falls et al. |
| 5,987,498 A | 11/1999 | Athing et al. |
| 6,026,433 A | 2/2000 | D'Arlach et al. |
| 6,044,374 A * | 3/2000 | Nesamoney ...... G06F 17/30592 |
| 6,058,366 A | 5/2000 | Tarkiainen et al. |
| 6,119,130 A | 9/2000 | Nguyen et al. |
| 6,135,646 A | 10/2000 | Kahn |
| 6,148,311 A | 11/2000 | Wishnie et al. |
| 6,163,880 A | 12/2000 | Ramalingam et al. |
| 6,199,077 B1 | 3/2001 | Inala et al. |
| 6,202,066 B1 | 3/2001 | Barkley et al. |
| 6,236,971 B1 | 5/2001 | Stefik et al. |
| 6,236,996 B1 | 5/2001 | Bapat et al. |
| 6,237,628 B1 | 5/2001 | Miller et al. |
| 6,327,628 B1 | 12/2001 | Anuff et al. |
| 6,338,086 B1 | 1/2002 | Curtis et al. |
| 6,345,329 B1 | 2/2002 | Baskey et al. |
| 6,351,741 B1 | 2/2002 | Flenniken |
| 6,353,851 B1 | 3/2002 | Anupam et al. |
| 6,389,540 B1 | 5/2002 | Scheifler et al. |
| 6,453,310 B1 | 9/2002 | Zander |
| 6,466,983 B1 | 10/2002 | Strazza |
| 6,546,397 B1 | 4/2003 | Rempell |
| 6,560,639 B1 | 5/2003 | Dan et al. |
| 6,643,661 B2 | 11/2003 | Polizzi et al. |
| 6,654,749 B1 | 11/2003 | Nashed |
| 6,668,353 B1 | 12/2003 | Yurkovic |
| 6,714,936 B1 | 3/2004 | Nevin |
| 6,745,238 B1 * | 6/2004 | Giljum ................ G06F 17/3089 707/999.102 |
| 6,772,146 B2 | 8/2004 | Khemlani et al. |
| 6,788,933 B2 | 9/2004 | Boehmke et al. |
| 6,931,546 B1 | 8/2005 | Kouznetsov et al. |
| 6,950,943 B1 | 9/2005 | Bacha et al. |
| 7,035,825 B1 | 4/2006 | Sturtevant et al. |
| 7,293,070 B2 | 11/2007 | Moses et al. |
| 7,350,231 B2 | 3/2008 | Madison et al. |
| 7,430,587 B2 | 9/2008 | Malone |
| 7,689,532 B1 | 3/2010 | Levy |
| 7,801,990 B2 | 9/2010 | Anuff et al. |
| 8,407,353 B2 | 3/2013 | Moses et al. |
| 8,606,916 B2 | 12/2013 | Moses et al. |
| 9,037,739 B2 | 5/2015 | Moses et al. |
| 9,521,046 B2 | 12/2016 | Anuff et al. |
| 2002/0002543 A1 | 1/2002 | Spooren et al. |
| 2002/0023147 A1 | 2/2002 | Kovacs et al. |
| 2002/0026359 A1 | 2/2002 | Long et al. |
| 2002/0029296 A1 | 3/2002 | Anuff et al. |
| 2002/0067370 A1 | 6/2002 | Forney et al. |
| 2002/0078168 A1 | 6/2002 | Christfort et al. |
| 2002/0078377 A1 | 6/2002 | Chang et al. |
| 2002/0083415 A1 | 6/2002 | Jazdzewski |
| 2002/0107768 A1 | 8/2002 | Davis |
| 2002/0156756 A1 | 10/2002 | Stanley et al. |
| 2002/0158899 A1 | 10/2002 | Raymond |
| 2002/0178439 A1 | 11/2002 | Rich et al. |
| 2002/0184165 A1 | 12/2002 | Deboer et al. |
| 2002/0194267 A1 | 12/2002 | Flesner et al. |
| 2002/0199123 A1 | 12/2002 | McIntyre et al. |
| 2003/0018964 A1 | 1/2003 | Fox et al. |
| 2003/0028610 A1 | 2/2003 | Pearson |
| 2003/0034905 A1 | 2/2003 | Anton et al. |
| 2003/0041198 A1 | 2/2003 | Exton et al. |
| 2003/0056025 A1 | 3/2003 | Moses et al. |
| 2003/0163438 A1 | 8/2003 | Barnett et al. |
| 2003/0182656 A1 | 9/2003 | Leathers et al. |
| 2003/0187966 A1 | 10/2003 | Sinha |
| 2003/0192031 A1 | 10/2003 | Srinivasan et al. |
| 2004/0015391 A1 | 1/2004 | Dupreez et al. |
| 2004/0162901 A1 | 8/2004 | Mangipudi et al. |
| 2004/0167984 A1 | 8/2004 | Herrmann |
| 2004/0205042 A1 | 10/2004 | Ritter et al. |
| 2004/0220897 A1 | 11/2004 | Bernhart et al. |
| 2004/0243640 A1 | 12/2004 | Bostleman et al. |
| 2005/0182963 A1 | 8/2005 | Phillips et al. |
| 2005/0223009 A1 | 10/2005 | Powers et al. |
| 2005/0289166 A1 | 12/2005 | Stanley et al. |
| 2010/0274812 A1 | 10/2010 | Moses et al. |
| 2011/0010454 A1 | 1/2011 | Anuff et al. |
| 2013/0227067 A1 | 8/2013 | Moses et al. |
| 2014/0052839 A1 | 2/2014 | Anuff et al. |
| 2015/0234797 A1 | 8/2015 | Moses et al. |
| 2017/0070399 A1 | 3/2017 | Anuff et al. |

OTHER PUBLICATIONS

"iPlanet™ Portal Server 3.0 Overall Architecture" (White Paper); iPlanet E-Commerce Solutions (A Sun/Netscape Alliance), 2000, 28 pages.
"Solving Real World Business Challenges: DataChannel Enterprise Information Portal Architecture" (Technical White Paper); DataChannel, Inc., 2000, 9 pages.
"Outlook 2000—Sharing Outlook Components," Microsoft Office 2000—Online Training, Nov. 25, 2000, 5 pages.
"Air Products Gets to Market Faster with Microsoft SharePoint Portal Server," Microsoft SharePoint Portal Server 2001, published Jun. 2001, 5 pages.
"Portal and Knowledge Management Roadmap," Portal & Knowledge Management Session Code: KB011SN; CA Computer Associates; CA World, 33 pages.
"Getting Started with WAR Files," IONA Technologies PLC, IONA/Portal Suite/iPortal Application Server, Mar. 6, 2002, 7 pages.
"NT-to-Win2K Migration Tools," Sep. 2000, Windows 2000 Magazine, 15 pages.
"Web Browser File Uploading to EAServer," Greg Douglas, Sybase Principle Consultant, Jan. 15, 2001, 5 pages.
International Search Report issued for PCT Patent Application No. PCT/US02/28226, mailed Dec. 19, 2002, 3 pages.
Office Action issued in U.S. Appl. No. 10/091,513, mailed Feb. 25, 2003, 5 pages.

(56) References Cited

OTHER PUBLICATIONS

Office Action issued in U.S. Appl. No. 10/091,513, mailed Aug. 11, 2003, 8 pages.
Office Action issued in U.S. Appl. No. 10/091,486, mailed Aug. 13, 2003, 7 pages.
"Developing Application with Jrun," Allaire Corp., pp. 1 to xxvi, 1-13, 378-413, May 10, 2001, 76 pages.
"Developing Web Applications with ColdFusion," Allaire Corp., pp. 1 to xiii, 219-230, 1999, 25 pages.
Office Action issued in U.S. Appl. No. 10/091,486, mailed Dec. 12, 2003, 9 pages.
Office Action issued in U.S. Appl. No. 10/091,513, mailed Jan. 29, 2004, 7 pages.
The Delphi Group, "Corporate Portal Architecture: Special Report on Infoimage Freedom," Nov. 1999, 20 pages.
Office Action issued in U.S. Appl. No. 10/091,486, mailed May 19, 2004, 8 pages.
Office Action issued in U.S. Appl. No. 10/091,513, mailed Jul. 13, 2004, 5 pages.
International Search Report issued for PCT Patent Application No. PCT/US01/19986, mailed Mar. 3, 2004, 8 pages.
Grosso, P., "XML Fragment Interchange," www.w3.org/TR/xml-fragment, Feb. 12, 2001, 31 pages.
Lie, H.W. et al., "Cascading Style Sheets, Level I," W3C, www.w3.org/pub/www.TR/REC-CSS1-961217, Dec. 17, 1996, 86 pages.
Courter, G. et al., "Mastering Microsoft Office 2000 Professional Edition," 1999, 131 pages.
King, J., "Companies Turn to Portals for Electronic Business," Aug. 22, 2000, 2 pages, Computerworld.
Johnson, H., "Epicentric Opens Doors to E-Commerce," Oct. 30, 2000, 5 pages, Computerworld.
"Delphi Group Names Sequoia's XML Portal Server Leading Application for Creating E-Business Portals," Jun. 27, 2000, 2 pages, Citrix Systems.
"Sequoia Software Announces New Java-Based Portal Server, XPS for Unix," Nov. 13, 2000, 2 pages, Citrix Systems.
Office Action issued in U.S. Appl. No. 10/091,486, mailed Oct. 20, 2005, 7 pages.
"Vignette Application Portal," Dec. 2002, 19 pages, V. 1.0, Vignette Corp.
Montalbano, E., "Epicentric Buys Web-Services Tool Company," Mar. 2, 2001, 3 pages, CRN, San Francisco, CA.
"Epicentric Foundation Server Wins "2001 Product of the Year" Award from CMP Media's Transform Magazine," Jan. 7, 2002, 4 pages.
"Tech Note—Configuring LDAP with Netscape Directory Server 4.1 for Epicentric Foundation Server 3.5-JNDI Full Mode," Mar. 15, 2001, 8 pages, Epicentric, Inc., San Francisco, CA.
Emmerich et al., "Implementing Incremental Code Migration with XML," ACM, pp. 397-406, ICSE 2000.
Schrefl, M. et al., "Self-Maintaining Web Pages—An Overview," 2001, pp. 83-90, IEEE.
Padmanabhan et al., "The Content and Access Dynamics of a Busy Web Site: Findings and Implications," 2000, pp. 111-123, ACM.
"Looking Under the Hood: Datachannel Server's Intelligent eXtensible Architecture (IXA), " DataChannel Server 4.0, 2000, pp. 1-12, DataChannel.
Choi, B., "A Few Tips for Good XML Design," Nov. 14, 2000, 16 pages , University of PA, Philadelphia, PA.
Challenger, J. et al., "A Publishing System for Efficiently Creating Dynamic Web Content," IEEEINFOCOM, pp. 844-853, 2000, IEEE.
Iyengar, A. et al., "High Performance Web Site Design Techniques," Mar.-Apr. 2000, pp. 17-26, IEEE Internet Computing.
Challenger, J. et al., "A Scalable and Highly Available System for Serving Dynamic Data at Frequently Accessed Web Sites," SC98, 1998, 30 pages. http://gallifrey.watson.ibm.com/sc98.
Office Action issued in U.S. Appl. No. 10/145,965, mailed Dec. 22, 2005, 9 pages.
Office Action issued in U.S. Appl. No. 10/145,965, mailed May 24, 2006, 11 pages.
Office Action issued in U.S. Appl. No. 10/091,486, mailed Jun. 28, 2006, 5 pages.
Office Action issued in U.S. Appl. No. 10/145,965, mailed Nov. 22, 2006, 9 pages.
Office Action issued in U.S. Appl. No. 10/145,965, mailed May 15, 2007, 10 pages.
Office Action issued in U.S. Appl. No. 10/145,965, mailed Oct. 22, 2007, 8 pages.
Office Action issued in U.S. Appl. No. 10/145,965, mailed Feb. 27, 2009, 9 pages.
Office Action issued in U.S. Appl. No. 10/145,965, mailed Aug. 10, 2009, 10 pages.
Office Action issued in U.S. Appl. No. 10/145,965, mailed Dec. 22, 2009, 12 pages.
Office Action issued in U.S. Appl. No. 10/091,513, mailed Nov. 30, 2010, 11 pages.
"Reference (computer science)," Wikipedia, Sep. 6, 2010, retrieved from http://en.wikipedia.org/wiki/Reference_(computer_science), printed Feb. 17, 2011, 5 pages.
"Identity (object-oriented programing)," Wikipedia, Nov. 8, 2010, retrieved from http://en.wikipedia.org/wiki/Identity_(object-oriented_programming), printed Feb. 17, 2011, 2 pages.
Office Action issued in U.S. Appl. No. 10/091,513, mailed May 12, 2011, 9 pages.
Office Action issued in U.S. Appl. No. 10/091,513, mailed Nov. 29, 2011, 11 pages.
Office Action issued in U.S. Appl. No. 12/762,087, mailed Dec. 15, 2011, 11 pages.
Office Action issued in U.S. Appl. No. 10/091,513, mailed Mar. 20, 2012, 13 pages.
Office Action issued in U.S. Appl. No. 12/762,087, mailed May 24, 2012, 10 pages.
Office Action issued in U.S. Appl. No. 12/885,977, mailed May 25, 2012, 4 pages.
Office Action issued in U.S. Appl. No. 10/091,513, mailed Jul. 30, 2012, 11 pages.
Office Action issued in U.S. Appl. No. 12/885,977, mailed Sep. 13, 2012, 11 pages.
Notice of Allowance for U.S. Appl. No. 10/091,513, mailed Nov. 23, 2012, 7 pages.
Notice of Allowance issued in U.S. Appl. No. 12/885,977, mailed Jul. 22, 2013, 5 pages.
Office Action issued for U.S. Appl. No. 12/762,087, mailed Feb. 26, 2014, 10 pages.
Notice of Allowance issued for U.S. Appl. No. 12/762,087, mailed Jan. 20, 2015, 6 pages.
Final Office Action issued for U.S. Appl. No. 12/762,087, mailed Jul. 22, 2014, 12 pages.
Office Action issued for U.S. Appl. No. 14/061,474, mailed Apr. 14, 2016, 6 pages.
Office Action issued for U.S. Appl. No. 14/701,842, mailed Nov. 9, 2016, 12 pages.
Notice of Allowance issued for U.S. Appl. No. 14/061,474, mailed Aug. 10, 2016, 6 pages.
Notice of Allowance issued for U.S. Appl. No. 14/701,842, mailed Apr. 14, 2017, 7 pages.

* cited by examiner

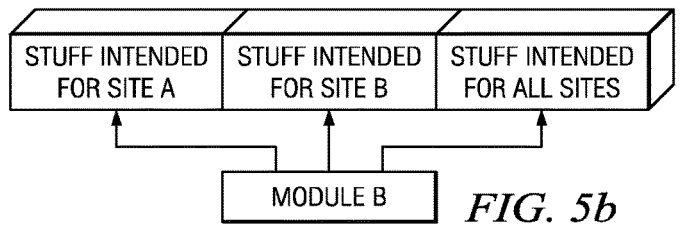
FIG. 5b
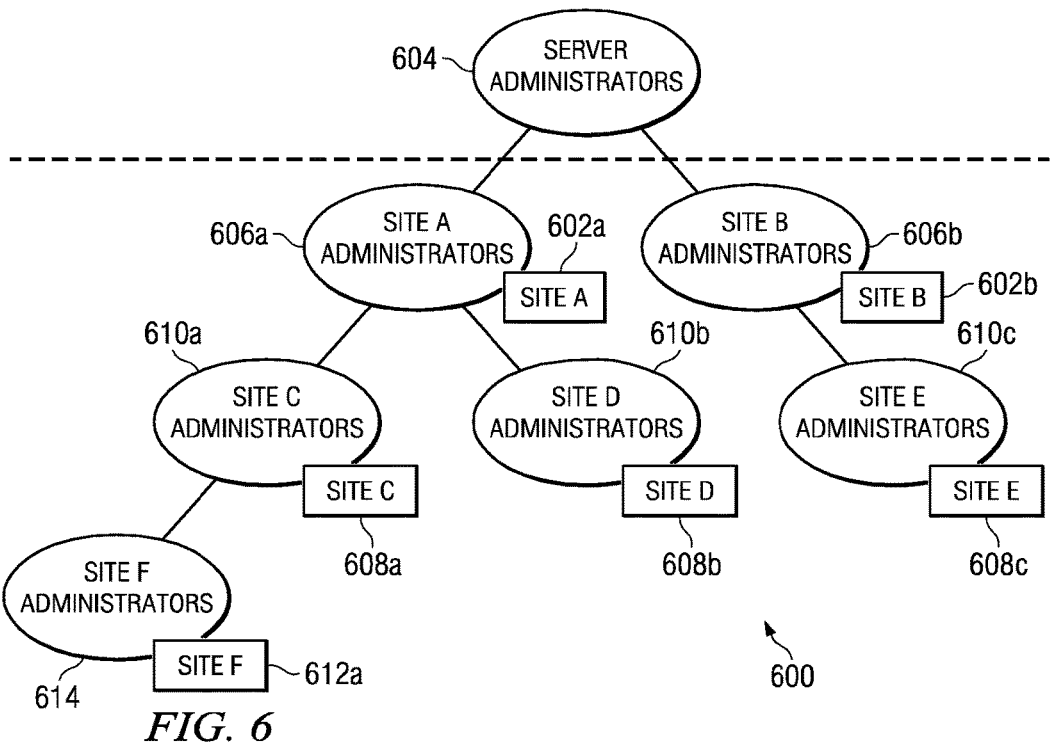
FIG. 5c
FIG. 6

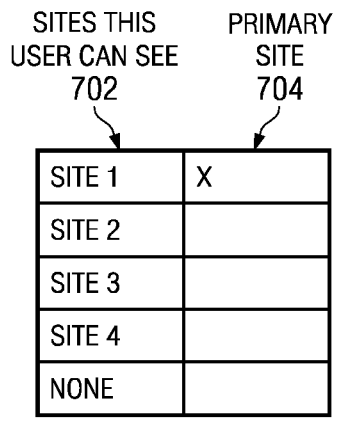
FIG. 7
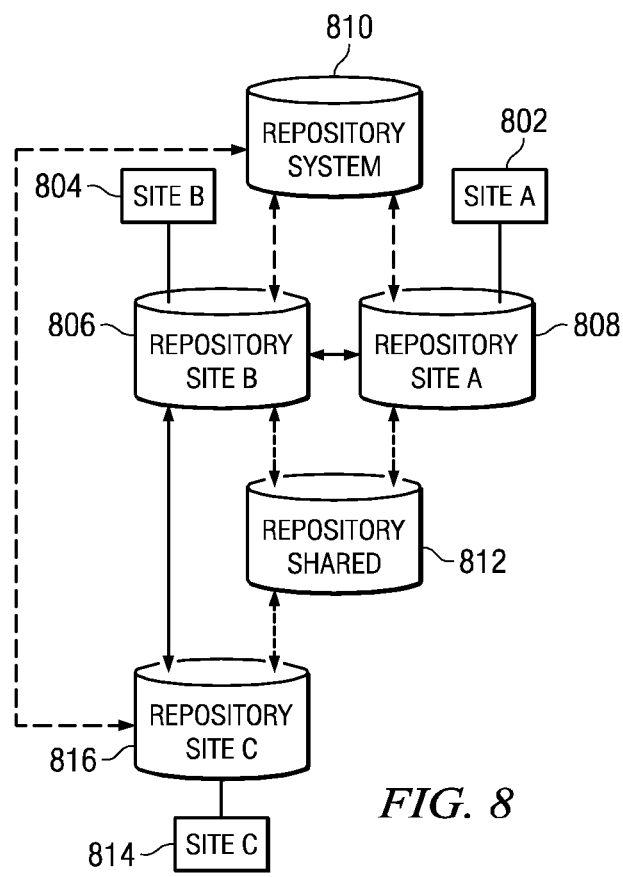
FIG. 8
| ELEMENT | SIMPLE SHARE | COMPOUND SHARE |
|---|---|---|
| THEMES | THEME | STYLE, TEMPLATE, FONTS AND COLORS, AND THEME |
| TEMPLATE | TEMPLATE | STYLES AND TEMPLATE |
| GRID | GRID AND TEMPLATE | N/A |
| STYLE | STYLE AND TEMPLATE | N/A |
| MODULE | MODULE AND MODULE TYPE | N/A |
FIG. 9

METHOD AND SYSTEM FOR SHARING WEB COMPONENTS BETWEEN WEB SITES

CROSS-REFERENCE TO RELATED APPLICATIONS

This is a continuation of and claims a benefit of priority from U.S. patent application Ser. No. 10/091,513, filed Mar. 7, 2002, which claims a benefit of priority from U.S. Provisional Application No. 60/322,462, filed Sep. 17, 2001, all of which are fully incorporated herein by reference.

TECHNICAL FIELD

This disclosure relates generally to web site management. More particularly, the disclosure relates to a method, a system and a computer program product for sharing web components between web sites, each web site having a collection of software web objects that can be manipulated by a set of users having assigned privileges defined by permissions associated with each software web object in the collection of objects.

DESCRIPTION OF THE RELATED ART

Traditionally, web sites have been considered to be all resource files organized and accessible from a given domain name associated with a system, such as a server. Typically, web sites have a common look, feel and navigational structure. Computer program code is implemented to provide the common look, feel and navigational structure of a web site. Portals have been implemented to provide a gate to access a plurality of web objects of a web site for simultaneous viewing on a display. Most companies and organizations provide different types of portals for a variety of purposes these include portals for the general public, intranet portals for their employees, as well as extranet portals for their customers, vendors, suppliers, and other parties with whom they transact business.

The complexity and cost of developing, deploying, administering and continually enhancing portals, is tremendous. In developing, deploying and maintaining portals, it is often necessary to implement objects of a web site. Typically, developing, deploying, enhancing and maintaining portals, such as implementing web objects of a web site provided by a portal, requires the physical selection and transfer of files to systems desired to implement web objects of a web site in a portal. Alternatively, the entire web site must be archived in a file and transferred to a system in order to implement the web site. This type of development, deployment, and maintenance of portals is complex, costly and prone to error. Additionally, the process requires the manual transfer of code and libraries to a system. Lastly, aspects of a web site cannot be made available to an intended group of users for commercial use. Companies and organizations are forced to maintain staffs of highly skilled engineers and content developers, or to outsource these tasks. Meanwhile, Internet-related technologies are proliferating and maturing, and Internet users' expectations continue to increase. Maintaining an effective portal often competes with and detracts from the resources available for an organization's primary goals.

There is a need for a new method of administrating web objects on a portal framework as a collection of software objects. There is a need for a method of managing the software object employing a set of users granted privileges associated with respective objects in the collection of software objects. There is a need for a new method of sharing objects of web site with other web sites. There is a need for a new method of unsharing objects of a web site from other web sites. There is a need for a new method to add shared objects to a web site.

SUMMARY OF THE INVENTION

According to embodiments, a method, a system and a computer program product for sharing an object in a portal framework are provided. Sites defined by a collection of software objects may be managed by a set of users granted privileges associated with respective objects in the collection of software objects. The sharing of objects may be executed by performing share type administrations. Objects may be shared directly to a site or may be shared indirectly made available for reuse by a site. The objects shared and made available for reuse may be added to the site to which they are shared and made available for reuse. References to objects are stored in repositories based on privileges associated with at least one of a repository, a site and a user. Objects made available for reuse by and shared to a site may be made unavailable for reuse by, and unshared to, the site through the execution of a share type administration.

A method of sharing an object in a portal framework includes storing a reference to the object in a first repository and performing a first operation to store a duplicate reference to the object in a second repository. The first operation is in accordance with a first privilege granted as defined by a permission. References to each child object or some child objects of the object in the second repository may also be stored in the second repository.

In an embodiment, the reference to an object is for an object of a first site. The performance of a second operation adds the object to a second site. The method further includes performing a third operation to remove the duplicate reference of the object from the second repository and the object from the second site.

In an embodiment, the method includes providing access to the duplicate reference of the object in the second repository. Access is provided in accordance with a second privilege granted as defined by a permission for the second repository. The method further includes performing a second operation to store a second duplicate of the reference to the object in a third repository. The performance of a third operation adds the object to a second site. The method further includes performing a fourth operation to remove the second duplicate of the reference of the object from the second repository and the object from the second site.

A computer program product for sharing an object in a portal framework includes a non-transitory computer readable medium and computer program instructions, recorded on the non-transitory computer readable medium, executable by a processor. The computer program instructions perform the steps of storing a reference to the object in a first repository and performing a first operation to store a duplicate of the reference to the object in a second repository. The first operation is in accordance with a first privilege granted as defined by a permission.

A system for sharing an object in a portal framework includes a first repository operable to store a reference to the object and a second repository operable to store a duplicate of the reference to the object in response to a first operation. The first operation is in accordance with a first privilege granted as defined by a permission.

BRIEF DESCRIPTION OF THE DRAWINGS

The above described features and advantages of the invention will be fully appreciated with reference to the detailed description and appended figures in which:

FIG. 5b illustrates exemplary rules governing setting of default values for permissions of objects in sites of framework in FIG. 1;

FIG. 5c is an exemplary diagram explaining the application of the non-site administration rule;

FIG. 6 illustrates an exemplary embodiment of a site hierarchy;

FIG. 7 depicts an exemplary form for setting primary site values according to an embodiment;

FIG. 8 illustrates an exemplary embodiment of object reuse between repositories in Framework 500;

FIG. 9 is an exemplary table illustrating objects and the objects they may reference and use;

DETAILED DESCRIPTION

The invention is now described fully hereinafter with reference to the accompanying drawings showing embodiments of the invention. The invention, however, may be embodied in many different forms and should not be construed as limited to embodiments set forth herein. Appropriately, these embodiments are provided so that this disclosure will be thorough and complete, and will fully convey the scope of the invention.

Overall Framework

Figure 1:
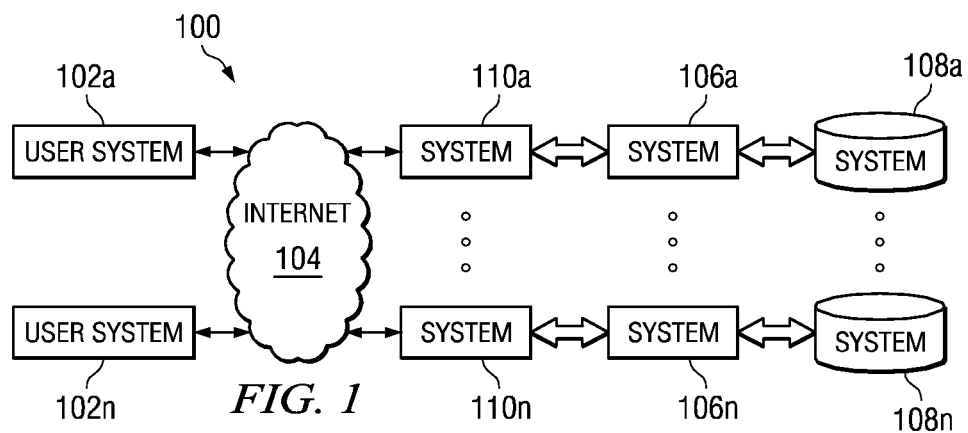
FIG. 1 depicts a functional block diagram of an embodiment of a framework in which the invention can find application.

FIG. 1 depicts a functional block diagram of a framework in which the invention can find application. In the embodiment of FIG. 1, Framework 100 may be implemented to provide for the administration of sites on Framework 100 as a collection of software objects that may be managed by a set of users granted privileges associated with respective objects in the collection of software objects. Framework 100 may employ and maintain portals to provide gateways for access to objects of a site. Framework 100 may be implemented to perform administration such as importing and exporting components of a site between portals on Framework 100, sharing objects between sites on Framework 100 and granting privileges associated with objects to users of Framework 100.

A console may be employed to perform administration on a site of Framework 100. A console may be a graphical user interface of an administration site provided to an administrator to perform administration on objects in Framework 100. For example, a server console is a graphical user interface of a server administration site operable to perform administration on all objects in Framework 100. Alternatively, a site console is a graphical user interface of an administration site provided to an administrator to perform administration on objects of one or more sites. Access to a given site console of an administration site may be governed by privileges defined by permissions, such as "can access site administrator context" permission for the site. Likewise, access to a given server console for an administration site be governed by privileges defined by permissions, such as "can access system administrator context" permission for the administration site. Access to an administration site may be provided by employing a link that appears to a user upon authentication of the user. A user with privileges to both a site console and server console may switch between consoles.

A site is considered, for the purposes of this disclosure, to be a collection of software objects given a single identity. The single identity may be characterized by a shared look-and-feel, a shared set of navigation links, and members of a group who are automatically granted privileges to perform administration on at least some of the software objects in the collection as well as elements of the site. The collection of software objects in a site includes non-file assets such as users, groups, modules, module types, pages, menus, themes, structures, styles and templates. Detailed descriptions of each software object in the collection are provided in U.S. Pat. No. 6,327,628 which is incorporated herein by reference.

Elements of a site include, but are not limited to, logon permissions, administrative permissions, site branding, site content and site navigation. Components of a site include file assets and non-file assets. File assets include resources such as code including JSP pages, ASP pages, Java classes and or object oriented programming language classes, and images including GIF files, etc. stored as a file on a file system and implemented to provide a site. Non-file assets include, but are not limited to, instantiated programming language objects stored in a database, such as described above (as opposed to static class files), and in addition to permissions, user preferences and settings.

A software object may represent an actor within an overall system design. Such actors may correspond to real-world concepts, or may exist purely to support the overall design. Software objects encapsulate the data and logical processes of the actor. This encapsulation makes software objects easy to use, because the user of a software object need not know how the software object performs its processes. Software objects are also extensible, where other software objects can be built on top of existing software objects, allowing the new software object to expand the concept of the old software object without having to rewrite the functionality of the old software object. These properties of software objects make object-oriented systems flexible and extensible.

An object model, such as an XML object model representation of web sites, includes a collection of software objects that work together in documented relationships. Framework 100 employs an object-oriented system built on such an object model. Each software object in Framework 100 is implemented employing a set of classes that define the behavior and characteristics of the software object when instantiated.

In an embodiment, logon permissions define the ability of a user to access a respective site. Administrative permissions define the ability of a user to perform administration on a respective site. Site branding defines the look-and-feel of a respective site. Site content includes objects in a collection of software objects available within a respective site. Site navigation defines the mechanism for moving between different areas of a site. Users may have privileges with respect to objects and elements in order to perform administration on the objects and elements of a site on framework 100.

In the FIG. 1 embodiment, framework 100 includes systems 102 (examples of which are shown as 102a-102n in FIG. 1), systems 106 (examples of which are shown as 106a-106n in FIG. 1), systems 108 (examples of which are shown as 108a-108n in FIG. 1) and network 104. Framework 100 may transmit using network 104, any combination of voice, video and/or data between devices. One having ordinary skill in the art would recognize that Framework 100 is highly scalable where any number of systems 102, systems 106 and systems 108 may be implemented to perform the functions of the invention.

Each system 102 couples to systems 110 employing network 104. Systems 102 may be any apparatus from which, and to which, any combination of voice video and/or data may be transmitted over a network 104, such as the Internet, Intranet or an extranet. Systems 102 may be used to provide for the administration of sites on framework 100 as a collection of software objects that can be manipulated by a set of users having assigned privileges defined by permissions associated with each software object in the collection of software objects, share objects between sites and automatically grant privileges associated with objects to users.

Each system 110 couples to a system 106 employing suitable communication means. Each system 110 may be any apparatus from which, and to which, any combination of voice video and/or data may be transmitted over a network 104, such as the Internet or an extranet. In a preferred embodiment, the system 110 is a web server. System 110 manages web page requests from system 102 and delivers HTML documents (Web pages) in response to the requests from system 106.

Each system 110 couples to a system 106 employing suitable communication means. Each system 106 may be any apparatus from which, and to which, any combination of voice video and/or data may be transmitted over a network 104, such as the Internet or an extranet. In a preferred embodiment, the system 106 is an application server. A set of systems 106 may be operable to implement the functions of the invention. The presentation of web site and administration of sites objects are implemented by system 106 employing software services that are provided by software and suitable class libraries that connect to other systems as needed. System 106 may provide processing between system 102 and system 108, such as delivery of information as well as processing information for users of system 102. Processing by system 106 may be performed by Java servlets, JavaServer Pages (JSPs), Enterprise JavaBeans (EJBs), Active Server Pages (ASPs) and ActiveX controls. The system 110 and system 106 can be one in the same computer system or separate computer system.

Each system 108 couples to a system 106 employing suitable communication means. Each system 108 may be any apparatus that executes program instruction in accordance with the invention to store data and provide software object persistence via a suitable database interface. In addition, system 108 may directly transfer information to system 110 or through system 106 in response to a request for information as well as transfer information to user system 102 in response to a request made to system 110 by user system 102 over network 104.

Network 104 may be a local area network, a wide area network, the Internet, an extranet, a wireless network, or the like. The network 104 may transfer information between system 102 and system 106, system 108 and system 110. The information transferred may include any combination of voice, video and/or data. Network 104 can be implemented as a wireless network or a wired network.

User groups of Framework 100 include, but are not limited to, an everyone group, user group, new user group, site administration group, shared group, Normal Groups, Guest Group, Registered Users Group, and Self Registered Users Groups. Groups define the characteristics of user members based on privileges granted to the groups to perform administration. The privileges granted to users and groups are defined by values assigned to permissions settings based on, in part, an occurrence of a type of administration in Framework 100. The values assigned to permissions may be set automatically as the result of a type of administration or operation by a type of administration operation.

An everyone group may be a virtual system group. It may contain every user in Framework 100, including guests. The everyone group IS a special conceptual group which allows batch permissions to be set for all groups implemented as a flag that lives on every permission which short-circuits the group-based permissions lookup. The Site Administration group may be automatically created for a site whenever a user creates the site. A site administration group may contain users granted privileges to perform administration on the site. Site administration groups may be stored in a special table in a system, such as system 108.

A User group may include users granted privileges to perform administration on an object of a site. A shared group may include members of a group available for sharing by a site. Members of the share group may access a site when granted privileges to access the site. A guest group may be a virtual group of users who are not registered with a site in a site context, or with any site in a system context. The members of the guest group may be granted privileges with respect to a site. Access to a site by members of the guest group may require the site to allow access by guest users. A new user group may be a new user assigned to a newly created site.

Registered users group may be a virtual group of users who are accessing a site in a site context, or a site in a system context, in accordance with privileges granted to access the site. The members of the registered user group may be granted privileges with respect to a site. Access to the site by members of a registered user group may require the site to allow access by guest users. A self-registered users group may be a virtual group of users who are accessing a site in a site context, or a site in a system context, in accordance with privileges granted by the site. The members of the registered user group may be granted privileges with respect to a site. Access to the site by members of a registered user group may require the site to allow self-registration by users. Normal group may be a group created by an administrator and given privileges as defined by the administrator for that group.

Framework 100 users include administrators, delegated administrators and end-users. Administrators include server administrators and site administrators. Server administrators are installation-level users who may have privileges over all aspects of an installation. Server administrator may have privileges over all objects in Framework 100 in accordance with permission settings. Server administrators may have privileges over objects of a site in accordance with privileges granted to the server administrator by membership within groups on Framework 100. Privileges granted server administrators may include administration of objects on a system and objects on sites. Administration may include, but is not limited to, deploying a site, locking down elements, creating sites anywhere in Framework 100, granting and revoking privileges to users for performing administration, configuring privileges for sites, logging on to end-user sites, mapping created sites to URL, modifying systems properties, site branding and sharing objects between sites. Administration by a server administrator may be performed in a system context from a server console accessible in accordance with privileges granted the server administrator and in a site context from a site console accessible in accordance with privileges granted the server administrator.

Site administrators may have privileges over at least some objects in Framework 100 in accordance with permission settings. Site administrators may have privileges over objects in a site in accordance with privileges granted the site administrators by membership in a site administration group. Privileges granted to site administrators may include administration of objects on a site. Privileges may be granted by configuring the permissions of a child site by a site administrator of a parent site to the child site, or directly by a server administrator employing a server console. Alternatively, site administrators may be granted privileges by configuring permissions for a site by a server administrator employing a server console. Privileges granted to a site administrator may include, but is not limited to, deploying sites, creating sub-sites of a site, accessing objects on Framework 100 for sites and sub-sites, managing the look, feel, membership and navigational structure of sites and sub-sites, modifying branding of sites and sub-sites, sharing objects with sites, overriding default site settings, previewing sites and performing user searches. A site administrator exists as long as the respective site there is a site administrator for exists.

Delegated administrators include delegated server administrators and delegated site administrators. Delegated Server Administrators may be granted privileges over at least some of the object in framework 100 in accordance with permission settings. Delegated Server administrators may be granted at least some of the privileges of a server administrator over objects by a server administrator. Administration by a delegated server administrator may be performed in a system context from a server console accessible in accordance with privileges granted the server administrator and in a site context from a site console accessible in accordance with privileges granted by the server administrator.

Delegated site administrators may be granted at least some of the privileges over at least some of the objects in Framework 100 in accordance with permission settings. Delegated site administrators may be granted at least some of the privileges of a site administrator over objects by the site administrator. Administration by a delegated site administrator may be performed in a site context from a site console accessible in accordance with privileges granted by the site administrator.

End-users include guest users and registered users. Guest users may be users not registered with a site, such as users without a password or login Id. A guest user may access sites allowing access by guest users. Registered users include users who have performed registration in order to receive a login Id and password for a site allowing self-registration by users. Registered user may access sites they are registered with as well as other sites allowing self-registration by users.

Permissions that may be configured by setting permission values to grant privileges include system permissions, site permissions, end-user permissions and object permissions. Permissions values may be set automatically, in response to the occurrence of a type of administration, and explicitly, by a type of administration. Systems permissions are granted in a system context. Systems permissions values may be set for a system to grant at least some privileges of a server administrator over the system to delegated server administrator. Privileges granted to delegated server administrators by setting systems permissions values may be performed by the delegated server administrator from a server console. System permissions includes can create ungrouped users permissions and can edit/delete ungrouped users permissions.

Site permissions are granted to site administrator in a site context. Site permissions may be set for a site to grant privileges to site administrators over the site. The site administrator may then delegate their privileges to groups within a respective site associated with the site administrator from the site console for the site. Privileges granted to a site administrator, by setting site permissions for a site, may be performed by the site administrator from the site console for the site. Site permissions include can add to site and can share to site.

Component (object) administration permissions are granted to administrators in a system context. In an embodiment, object administrative permissions may be set for an object to grant privileges to a delegated administrator, such as a delegated site administrator, over the object from a server console and a site console. Privileges granted to delegated administrators by setting objects administrative permissions from the server console may be performed from a server console and any site console by the delegated administrators. Privileges granted to delegated administrators by setting objects administrative permissions from the site console may be performed from a server console and a site console of a site by the delegated administrator.

End User Permissions may define tasks performable by end-users. End user permissions values may be configured by administrators, such as server and site. End User permissions values configured in the site context apply to a site. End User permissions values set in the system context for objects apply to all sites that employ the object. End user permissions include module enabled, module editable, module minimizable and menu enabled. End user permission may define tasks performable by groups. An end user permission for a group set from the system context applies to the group in all sites in the system. For example, a site will have no control over user access to a module with module enabled permission for the everyone group set.

Figure 2:
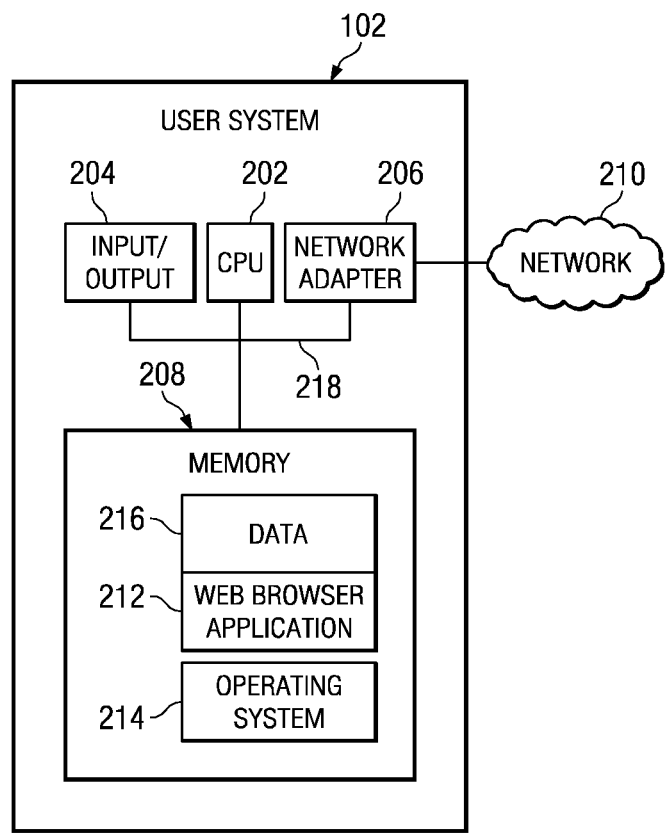
FIG. 2 depicts a functional block diagram of a system depicted in the framework of FIG. 1.

FIG. 2 is a block diagram illustration of end user systems 102. The end user systems 102 may include CPU 202, connected by a bus or other suitable interface means to system memory 208. The user system 102 can also include input/output device interface, and display interface 204. Input/output device interface 204 enables interaction with and execution of instruction by user system 102 as directed by a user. Display interface can display information generated for output by use system 102 as provided by system 106. As shown, the various components of the user system 102 communicate through bus 218 or similar architecture. Accordingly, systems memory 208 is disposed in communication with CPU 202 through bus 218. Systems memory 208 includes Browser Program 212, operating system 214 and data 216.

Operating system 214 provides overall system functionality. Browser program 212 implements computer program instructions executed by CPU 202. The browser program 212 enables the information transmitted from system 106 to be conveyed to a user in a manner that can be understood by a user of user system 102. The browser program 212 serves as a front end to the World Wide Web on the Internet. The browser program 212 may be used to display interfaces, such as consoles to perform administration on sites of framework 100 over network 104.

Figure 3A:
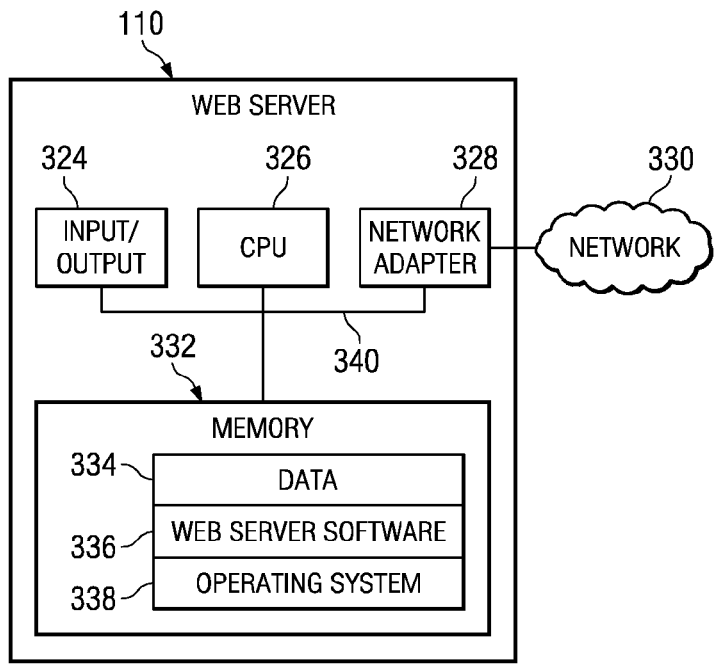
FIG. 3a depicts a functional block diagram of a system depicted in the framework of FIG. 1.

FIG. 3a is an exemplary block diagram of system 110 illustrated in FIG. 1, in which the invention may be implemented. System 110 manages web page requests from system 102 and delivers HTML documents (Web pages) in response to the requests from system 106. System 110 includes a processor (CPU) 326 connected by a bus 340 to memory 332, network interface 328 and I/O circuitry 324.

In the FIG. 3a embodiment, CPU 326 is a microprocessor, such as an INTEL PENTIUM® or AMD® processor, but may be any processor that executes program instructions in order to carry out the functions of the invention. As shown, CPU 326 and the various other components of the system 110 communicate through a system bus 340 or similar architecture. Network interface 328 provides an interface between system 110 and a network 104, such as the Internet. The network 104 may be a local area network (LAN), a wide area network (WAN), or combinations thereof. I/O circuitry 304 provides an interlace for the input of structured information to and output of structured information from system 110. I/O circuitry 304 includes input devices, such as trackball, mice, touchpads and keyboards, and output devices, such as printers and monitors.

In the FIG. 3a embodiment, memory 332 stores operating system 338, web server software 336 and data 334. Operating system 338 provides overall system functionality. Data 334 may be any structured data required by system 110. Web server software 336 performs the functions for managing the delivery of web pages.

Figure 3B:
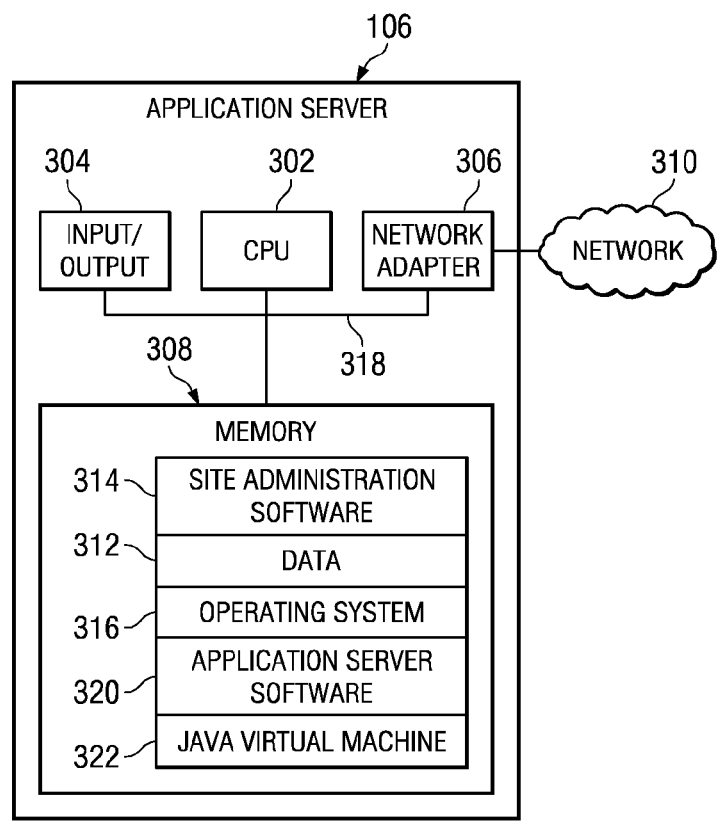
FIG. 3b depicts a functional block diagram of a system depicted in the framework of FIG. 1.

FIG. 3b is an exemplary block diagram of system 106 illustrated in FIG. 1, in which the invention may be implemented. System 106 performs the functions for administration of sites on framework 100 as a collection of software objects that can be manipulated by a set of users having assigned privileges. System 106 includes a processor (CPU) 302 connected by a bus 318 to memory 308, network interface 306 and I/O circuitry 304.

In the FIG. 3b embodiment, CPU 302 is a microprocessor, such as an INTEL PENTIUM® or AMD® processor, but may be any processor that executes program instructions in order to carry out the functions of the invention. As shown, CPU 302 and the various other components of the system 106 communicate through a system bus 318 or similar architecture. Network interface 306 provides an interface between system 106 and a network 104, such as the Internet. The network 104 may be a local area network (LAN), a wide area network (WAN), or combinations thereof. I/O circuitry 304 provides an interface for the input of structured information to and output of structured information from system 106. I/O circuitry 304 includes input devices, such as trackball, mice, touchpads and keyboards, and output devices, such as printers and monitors.

In the FIG. 3b embodiment, memory 308 stores site administration software 314, operating system 316, data 312, application server software 320 and java virtual machine 322. Operating system 316 provides overall system functionality. Data 312 may be any structured data required by system 106, such as asset files and non-asset files. Site administration software 314 includes modular applications that run within sites. Administration software 314 provides the functionality for providing and managing of sites on framework 100 as a collection of web objects that can be manipulated by a set of users having assigned privileges defined by permissions associated with each object in the collection of objects. The java virtual machine 322 converts the Java intermediate language (bytecode) into machine language and executes it. Application server software 322 performs the functions for processing between system 102 and system 108

Figure 4:
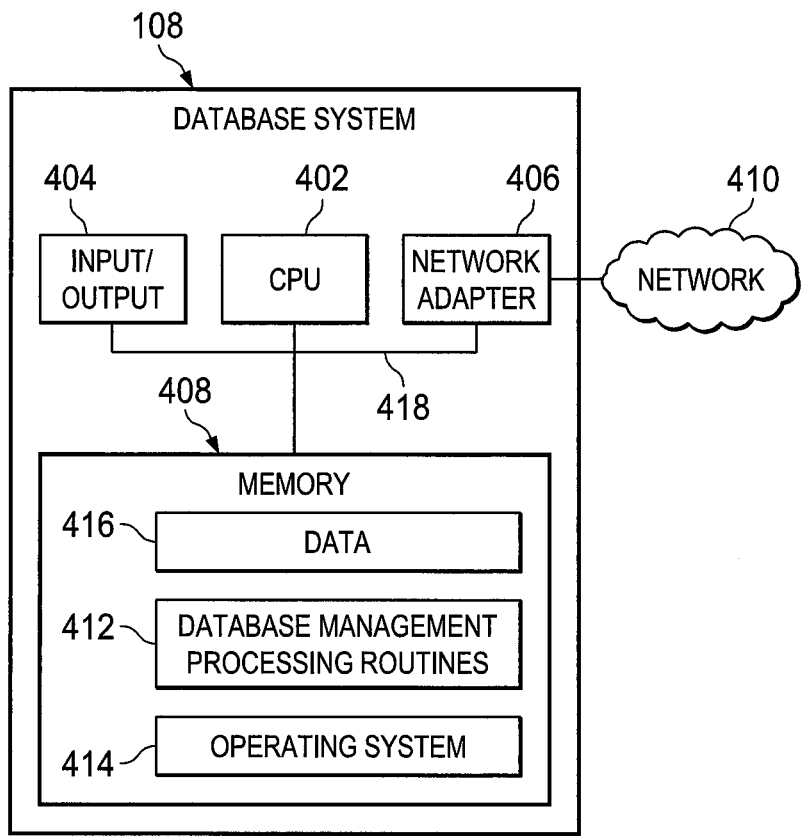
FIG. 4 depicts a functional block diagram of a system depicted in the framework of FIG. 1.

FIG. 4 is an exemplary block diagram of system 108 illustrated in FIG. 1, in which the invention may be implemented. System 108 may be a database management system that includes data for retrieval by system 106 and employed by Framework 100 to perform the functions associated with the invention. In the FIG. 4 embodiment, system 108 is a general purpose computer, such as a workstation, personal computer, server or the like, but may be any apparatus that executes program instruction in accordance with the invention. System 108 includes a processor (CPU) 402 connected by a bus 418 to memory 408, network interface 406 and I/O circuitry 404.

In the FIG. 4 embodiment, CPU 402 is a microprocessor, such as an INTEL PENTIUM® or AMD® processor, but may be any processor that executes program instructions in order to carry out the functions of the invention. As shown, CPU 402 and the various other components of the server 108 communicate through a system bus 418 or similar architecture. Network interface 406 provides an interface between system 108 and a network 104, such as the Internet. The network 104 may be a local area network (LAN), a wide area network (WAN), or combinations thereof. I/O circuitry provides an interface for the input of structured information to and output of structured information from system 108. I/O circuitry 404 includes input devices, such as trackball, mice, touchpads and keyboards, and output devices, such as printers and monitors.

In the FIG. 4 embodiment, memory 408 stores data 416, such a file asset and non-file assets employed by Framework 100. Memory 408 includes routines, such as database management routines 412, and operating system 414. Memory 408 includes memory devices, such as read only memory (ROM), random access memory (RAM) hard disks, CD-ROMs, floppy disks, optical storage devices, magnetic storage devices, etc.

Repository Framework

Figure 5A:
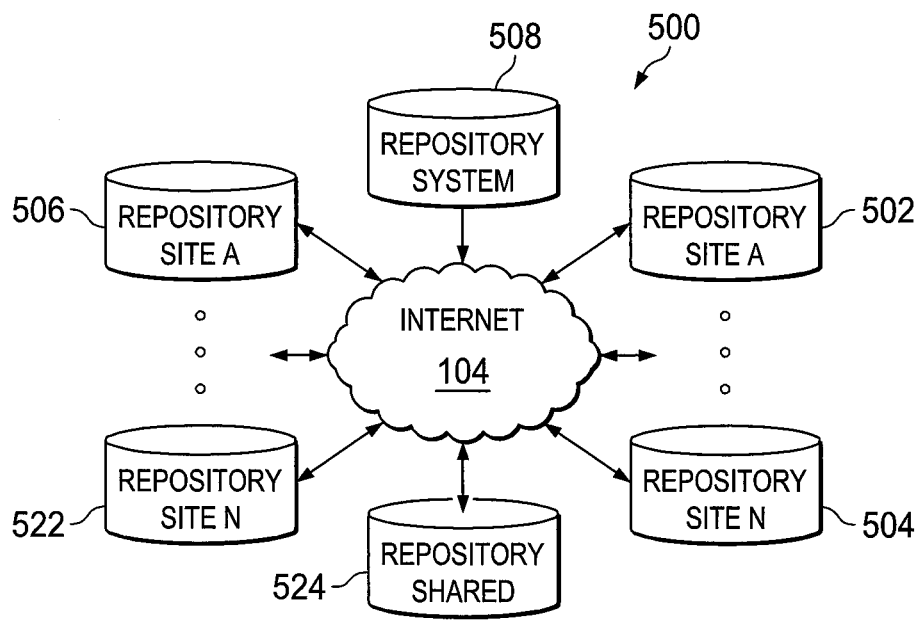
FIG. 5a illustrates an exemplary repository framework for storing a collection of references to a collection of objects of sites in Framework 100 according to an embodiment.

FIG. 5a illustrates an exemplary repository framework for storing a collection of references associated with a collection of objects in Framework 100 for sites according to an embodiment. In the FIG. 5a embodiment, the repository framework 500 may be implemented to perform a sharing type of administration. A sharing type of administration makes an object in Framework 100 available for reuse by a site, directly or indirectly, by storing duplicates to a reference to the object in one or more repositories. In the FIG. 5 embodiment, repository framework 500 includes site repositories 502, 504, 506, and 522, a system repository 508 and a shared repository 524. A combination of at least two repositories in framework 500 may be employed to perform a sharing type of administration. A reference to an object in Framework 100 may be stored in any number of repositories in repository framework 500 or in no repositories at all.

In the FIG. 5a embodiment, a site repository 506 stores a collection of references to a collection of objects for a site. The collection of objects may be stored in a system, such as 108. Each site in Framework 100 has an associated site repository. References to objects may be stored in a site repository based on privileges granted with respect to the site associated with the site repository. For example, a site desiring to perform a share type administration must have privileges over the site where a reference to an object is to be stored.

A site repository provides partitioning of referenced objects in Framework 100 based on sites and constrains viewing of referenced objects stored in a site repository to a set of users, such as site administrators. This type partitioning provides a security model that facilitates the creation of unique sites. Storage of duplicate references to objects in a site repository 506 makes the object available for reuse by a site associated with the site repository 506. For example, a site A will be able to use objects in a repository for site A and a site B will be able to use objects in a repository for site B. Each object available for reuse in a site repository may be provided with permissions to define privileges for the object.

A site administrator for a site may be automatically granted privileges over objects referenced in a site repository for the site. In the FIG. 5a embodiment, the set of privileges includes viewing and modifying the references to objects in the site repository 500 for a site. Modification of objects referenced in a site repository 500 for a site may include adding and removing the references to objects in the collection of software objects stored in the site repository.

In the FIG. 5a embodiment, the reference to objects stored in a site repository 506 may include references to groups. Each reference to a group may allow for access to individual users in the group. Each group may be granted privileges to create, edit and delete ungrouped users. An ungrouped user is a user not yet assigned to group. The ungrouped user may or may not have privileges associated with other groups. System permissions, such as can create ungrouped users and can edit/delete ungrouped users, define groups privileges to create, edit and delete ungrouped users. The storage of references to groups in a site repository makes the groups and the respective users in the group available for functions done in the context of the site for the site repository. In an embodiment, users may not be shared between site repositories.

In the FIG. 5a embodiment, a system repository 508 is a view of a collection of references to objects on Framework 100. The references to objects provided in a view of a system repository 508 are based on privileges granted to a user to access objects in Framework 100. The references to objects provided in the view may be further based on system repository privileges, such as can see system repository privileges and can see system administration context privileges, granted to the user with respect to accessing the system repository. The values of permissions, such as can see system repository and can see system administration context, define the system repository privileges.

In the FIG. 5a embodiment, a shared repository 524 stores a collection of references to a collection of objects on Framework 100 that are available for reuse by sites on Framework 100. Each site in Framework 100 has a section in a shared repository 524 as illustrated in FIG. 5b and discussed further herein below. The storage of references to objects in a shared repository may require designation of the section of the shared repository for a site. The references to objects stored in a section of shared repository for a site are the objects available for reuse by the site. An object may be referenced in a share repository a number of times, such as once in a section for each site, on Framework 100 in the shared repository. For example, module B is stored once in a site A section, a site B section, and an All Sites section of a shared repository. In the FIG. 5a embodiment, references to objects will be stored in a shared repository as read-only by default in both a site context and system wide context. Site administrators of a site may be granted privileges to modify the read-only status of references to objects in a section of a shared repository for the site.

In an embodiment, references to objects may be stored in a section of a shared repository for a particular site by users having visibility privileges for the site and can share into shared repository privileges for the system. These privileges may be granted by setting appropriate permissions values for the user. In order to share objects to an All Sites section of a shared repository can share to all sites privileges may be required by users sharing the objects. All sites privileges may be granted to users by setting all sites system permissions for the users.

References to objects stored in a shared repository may be viewed by a set of users. In an embodiment, references to objects stored in a shared repository may be viewed by a set of users in a site context and a system context. References to objects viewed from a site context and system context may be references to objects in a section of a shared repository for the site. A set of users having can see shared repository privileges for a particular site may view the reference to objects in the section of a shared repository for the site. The set of users may be granted these privileges by setting can see shared repository permissions for the set of users. In an embodiment, references to objects viewed from a system context. References to objects viewed from a system context may be references to objects in a shared repository. A set of users having system wide can see shared repository privileges may view objects in a section of a shared repository for the site. These privileges may be granted to the set of users by setting system wide can see shared repository permissions.

In an embodiment, an unsharing type of administration removes an object in Framework 100 from a site by removing a reference to the object. An object may be removed from a site by removing the reference to the object from a repository. This type of unsharing applies to the site that the objects were intended to be shared with by the user. For example, if an object was shared to a site B by a site A and shared by site B to a site C, unsharing by site A only affects site B and not site C. In order for the object to be unshared to site C, site B will have to unshare the object. Objects may be unshared with all sites by deleting the objects from the Framework 100.

Automatic Permissioning Framework

Permissions to define privileges associated with objects may be set with default values in Framework 100. Default values automatically grant privileges with respect to objects. FIG. 5b illustrates exemplary rules governing setting of default values for permissions of objects. In an embodiment, the rules governing setting of default values for permissions of objects apply all the time. They are not mutually exclusive. The default values may be overridden after creation in a site context or system context. Automatic permissions prevent objects from being orphaned the moment they are created, provide creators of objects access rights to the objects, allow a peer group of a set of users to also have access rights over the object, allow a set of users to perform administration on that object other than the creator and reduces administration duties.

Privileges may be granted automatically to users and groups in Framework 100 in order to perform various types of administration. The automatic grant of privileges is governed by rules implemented by Framework 100. In an embodiment, the rules implemented by Framework 100 define values automatically assigned to permission values based on, in part, an occurrence of a type of administration in Framework 100. The values automatically assigned to permission can be overridden at the site level provided a set of users have the privileges to modify the system properties in a site context.

The rules governing the automatic privileges include object type create, site transfer, site administration group, non-site administration group and delegated administration. In an embodiment, the object type create rule pertains to the creation of a new object on systems level and applies to users having system level permission to create that particular type of object. In an embodiment, the object type create rule pertains to the creation of a new object on a site level and applies to users having permission in a site to create that particular type of object.

The site transfer rule defines the transfer of objects to a site repository. In an embodiment, the site transfer rule precludes the storing of references to objects to a site repository by users without "can add to this site" permission for a site associated with the site repository. In an embodiment, the site transfer rule precludes sharing objects to a site repository by users without "can share to site" permission for the site associated with the site repository. Sharing objects may include performing a share type administration to store a reference to an object in a respective repository. In an embodiment, the site transfer rule precludes sharing objects to a system repository by users without site-level "can share to server" permission.

The site administration rule defines permission value settings for object to specify the scope of administrative privileges automatically provided to an administration group. In an embodiment, a site administrator group is granted full administrative privileges over objects created for a site. This rule enables a user assigned to the administration group for a site to maintain strict control over the site as well as prevents the creation of objects by users other than users assigned to the administration group which may be then left the responsibility of the users in the administration group.

The non-site administration rule defines the scope of administration privileges provided to a group as a result of object creation. A user may be included in a set of groups with can create privileges. In an embodiment, a non-site administration group is granted full administrative privileges over objects created by a user in the non-site administration group and granted can create privileges by the non-site administration group. In an embodiment, a non-site administration group is selected to be granted full administrative privileges over objects created by a user in groups which include the non-site administration group and granted can create privileges by the non-site administration group.

FIG. 5c is an exemplary diagram explaining the application of the non-site administration rule. The non-site administration rule applies when a user having can create privileges creates an object in a site. In an embodiment, a user having can create privileges due to membership in a single group will result in the single group having full privileges over objects created by the users. In an embodiment, a user having can create privileges due to membership in more than one group will result in one of the groups having full privileges over objects created by the user. The group having full privileges is selected by the user. In an embodiment, a user having can create privileges due to membership in more than one group, including a site administration group, will result in the site administration group and another one of the group having full privileges over objects created by the user. The group other than the site administration group having full privilege is selected by the user.

In the embodiment of FIG. 5c, column 510 is a list of groups having "can create z" permission for a site Y. Each cell in columns 512-520 specifies the groups that users 1-user user 5 have membership. In the examples shown in FIG. 5c, User 1 is a member of the site Y Administrator Group. The site Y Administrator Group is automatically given full administrator permission over Z without prompting user 1 to select the group. User 2 is a member of both Group A and the site Y Administration Group. Group A is selected to grant full administration privileges over Z with prompting to user 2. The site Y Administration Group is automatically granted full administrative privileges over Z without prompting user 2. User 3 is the similar to User 2 except that the user may select more than one group to grant full administration privileges over Z. User 4 is similar to User 1 in that the site administrator group is automatically granted full administrative privileges over Z without prompting user 4, while Group A is selected to grant full administrative privileges over Z with prompting to user 4. User 5 is similar to User 3 except that the user is prompted to select 1 or more groups.

The delegated administration rule requires that an object created by a delegated administrator in a system context designates at least one group having can create privileges for the object to receive full administrative permission over the object.

Framework Administration

Administration of sites may be implemented by site administration software 314. Administration may include, but is not limited to, deploying a site, locking down elements, creating sites anywhere in Framework 100, granting and revoking privileges to users for performing administration, configuring privileges for sites, mapping created sites to URL, modifying systems properties, site branding, sharing objects between sites and deploying components between portals. The administration of sites may be performed in a site context and a system context. Administrative users and delegated administrative users having both administrative visible privileges for a site and can access site administration context privileges for the site may perform administration in a site context. The Administrative users and delegated administrative users may be granted these privileges through the setting of administrative visible permissions for a site and can access administration context permissions for the site.

Administrative users and delegated administrative users having both can see system repository privileges and can access system-wide administration context privileges may perform administration in a system-wide context. The Administrative users and delegated administrative users may be granted these privileges through the setting of can see system repository permissions and can access system administration context permissions. The Administrative users and delegated administrative users may perform administration on all objects in Framework 100 based on privileges automatically granted, such as server administrators, or by delegation, such as delegated administrators. Administration may be performed on a site context to system properties having default values.

The creating site administration type may include creating sites. Sites may be created on Framework 100 in a bulk automated fashion and a manually piece by piece fashion. The number of sites that may be created is unlimited. Additionally, sites may be created where sites are organized in a tree structure forming a site hierarchy. Created sites may be viewed and maintained by users granted privilege to view and/or maintain created sites. Privileges may be granted to users automatically or by delegation.

Sites may be created on Framework 100 in a bulk automated fashion and a manual piece by piece fashion. Bulk site-creation may be performed by employing an XML-based Sites Installation Utility. Bulk site-creation may be performed at an initial installation of the invention or at a special post-installation of the invention. Installation of the invention may be performed without restarting systems of Framework 100 based on the types of elements, such as new module types and users contained within added sites. Software installer and individual module installers enable the addition and update of sites without restarting the software instance. This bulk mechanism shall work across clustered installations.

Manual Site creation may be performed by a set of users as defined by privilege granted automatically or specifically delegated by a user with privileges to delegate such privilege. The set of users may include a user, such as a server administrator, a set of users assigned site creation privileges by the user, and a set of users assigned site creation privileges by the set of users assigned site creation privileges.

The number of sites that may be created is unlimited. In an embodiment, the number of sites that may be created is predetermined to a maximum number of N sites. The maximum number of sites created versus the number of remaining sites that may be created is available to a user, such as a server administrator. In an embodiment, the creation of a maximum number sites precludes the creation of additional sites beyond the maximum number. This may disable the availability of create site functionality.

Each site may include selectable options to control accessibility to a site. The selectable option includes a site enabled, site preview, a remember me and re authentication. These options may be selected by administrators, such as site and server. The site enabled option may control the publishing of a site and the visibility of the site by end-users. The site enabled options overrides standard permissions on the site for viewing the site. Site administrators for a site may view the site despite the setting of the site enabled option. The site preview option may be selectable from the administration console. An administrator of multiple sites may preview each of the sites in a system context employing an administration site. Previewing a site includes an administrator selecting the identity of a user to define a perspective from which to preview a site.

In an embodiment, the administrator has edit/delete permission over the user whose identity is selected. The re-authentication (re-login) option for a site requires a user who has already logged to another site in Framework 100 to login to the site that requires reauthentication. Once a user has logged into a site with the re-authentication option selected, the user will be authenticated for the duration of the session with the site. In an embodiment, a user should remain authenticated against all sites in the system that the user was previously authenticated. The Remember Me option allows users ids to be stored on their computer.

The ability of a user to perform administration may be defined by create site privileges granted to the user. In an embodiment, the created site privileges may be granted by setting requisite permissions for the user. Create site privileges may be granted automatically and by delegation. For example, create site privileges may be granted automatically to the user, such as server administrator and a member of a site administration group, upon the occurrence of an event, such as installation of the invention and creation of a site.

Alternatively, create site privileges may be granted by delegation to the user, such as delegated administrators and end-users, upon the assignment of create site privilege by a user having create site privileges. Sets of users automatically granted create site privileges facilitate the maintenance of sites. Site administrators exist for as long as the site for which they have create site privileges exists. For example, a site administration group is created upon the creation of a site and automatically receives create site privileges to create a site as well as immediate control over the sites functionality, look-and-feel, navigational format, and user membership. This group and the members assigned to this group may exist for as long as the site that their create site privilege is based upon exists.

Sites created in Framework 100 may be organized in a tree structure to form a site hierarchy. A site hierarchy is a group of sites that have a hierarchical administrative organization. Administrators of a site may perform administration on a sub-site of the site including granting create site privileges to users to create subsites to the site and can share to site privileges to users to allow sharing objects to the site. Privileges granted by a site administrator to users of sub-sites may be revoked by the site administrator. This type of site creation provides a permissioning hierarchy.

FIG. 6 illustrates an exemplary embodiment of a site hierarchy, implemented by the invention. In the FIG. 6 embodiment, Site A (602a) and site B (602b) are parent sites (top-level site). These top-level sites were created by a set of users (604), such as server administrators, automatically granted create site privileges upon an event, such as installation of the invention. Upon creation of the top level site 602, a set of users 606a and 606b, such as members of a site administrator group, were defined to maintain the top level sites 602 respectively, were granted create site privileges to create sub-sites to the top-level sites 602 and can add lean share to site privileges to service objects with sites, such as by storing a reference to an object in the site's repository directly or indirectly. In the FIG. 6 embodiment, create site privileges may not be granted by delegation to the set of users 606 or other sets of users based on create site privilege of a top-level site 602 by users 604 or 606.

Each of the users in the set of users 606a may create a set of sub-sites, such as site C (608a) and site D (608b), of site 602a. Likewise, each of the users in the set of users 606b may create a set of sub-sites, such as site E (608c), of site 602b. Upon creation of sub-sites 608, a set of users 610a, 610b and 610c, such as site administrators, were defined to maintain sub-sites 608 respectively as well as automatically granted create site privileges to create sub-sites to sub-sites 608. In the FIG. 6 embodiment, create site privileges may be granted by delegation to sets of users (not shown) based on create site privilege of sub-sites 608 by users, such as 610, having create site privileges for sub-sites 608.

Each of the users in the set of users 610 may create a set of sub-site, such as site F (612), of site 608a. Upon creation of sub-site 612, a set of users 614, such as site administrators, were defined to maintain sub-site 612 as well as automatically granted create site privileges to create sub-sites to sub-site 612. In the FIG. 6 embodiment, create site privileges may be granted by delegation to sets of users (not shown) based on create site privilege of sub-site 612 by users, such as 614, having create site privileges for sub-sites 612.

The set of users, such as server administrators, may perform modifying systems properties type administration on properties including system module display categories, default branding/theme, default module palette set for new sites and default security settings. Default security setting include allow self-registration, email replacement passwords, allow guest users, force re-authentication and allow per-user branding overrides. Default value settings are values that one or more permission of all new sites will be given automatically.

The set of users, such as server administrators, may also perform modifying systems properties type administration on properties and objects including administrative site branding, dialog pages, error pages and tool modules. Administrative site branding includes setting the theme and structure of a site as well as enabling child site to override administrative site branding.

The mapping created sites to URL type administration may be performed on sites created in Framework 100. A site mapping to a URL type administration is an association of a particular site with a valid hostname for a server/computer. In an embodiment, site to URL mappings will be specified in the system administration context by, a set of user for a site, such as server administrator. Each site in the system can have a set of URL mappings. For example, a URL can only be mapped to one site.

Site to URL mappings specified in a system administration context may be overridden by modifying primary site values. In an embodiment, primary site values are modified employing an administration site for a set of users, such as end-users. The administration site may be provided as a form for setting primary site values.

FIG. 7 depicts an exemplary form for setting primary site values according to an embodiment. The form 700 may include a site column 702 and a primary site column 704. The site column 702 lists sites in Framework 100 accessible (enabled) to a set of users for whom primary site settings are being set, and "visible" for an administrative set of users, such as site administrators. Primary site column 704 indicates a site designated as a primary site from the list of sites in the site column 702. The designation of a primary site is optional and may be forgone by designating None.

A server administrator may optionally select a site as a default site for framework 100. In an embodiment, a default site is provided whenever a requested URL or IP address is not mapped to a site in Framework 100. A server administrator may optionally select wildcard DNS behavior for sites. The wildcard DNS option disables site to URL mappings to make new sites in the system automatically addressable as http://sitename.domainname. The domain name, such as "epicentric.com", will be shared by all sites when the wildcard DNS option is selected.

An object of a site may be shared (reused between sites) and made available for reuse by another site directly or indirectly. FIG. 8 illustrates an exemplary embodiment of object sharing (reuse) between sites employing Framework 500, implemented by the invention. In the FIG. 8 embodiment, various methods are depicted for sharing an object of site A 802 to site B 804 and site C 814 under system and site administrative contexts. Permissions for sharing an object within a site may be set from within a site context and system context. Permissions set from a site context will generate a system group in the source group column for any new permissions added to a Permissions Granted table.

An object may be directly shared with a site in a site context. In an embodiment, a reference to an object of site A 802 is stored in the site repository 808 for site A 802. The object of site A 802 may be shared directly with site B 804 through the execution of a share type administration. The share type administration may include storing, in the site B repository 806, a duplicate of the reference to the object. The execution of a share type administration may require that the site performing the share type administration have can share privileges with respect to the site where the object is being shared. This privilege may be granted by setting a can share to site B 804 permission for site A 802. Users of site A 802, such as site Administrators for site A 802, may be precluded from viewing the site B repository 806. Users of site A 802, such as site Administrators for site A 802, may be notified of objects shared as well as allowed to discontinue use of shared objects. The object shared may be added to site B 804 through the execution of a share type administration.

An object may be indirectly shared with a site in a site context. In an embodiment, a reference to an object of site A 802 is stored in the site repository 808 for site A 802. The object of site A 802 may be made available for reuse by site B 804, through the execution of a type administration. The type administration may include storing, in the section of the shared repository 812 for site B 804, a duplicate of the reference to the object. The object made available for reuse by site B 804 may be shared with site B 804 by executing another share type administration. This share type administration may include storing in the site B repository 806, a second duplicate of the reference to the object of site A 802. The execution of a share type administration may require that the site performing the share operation have can share privileges for the shared repository 812. The user performing the share type administration to share the object to the site may have can add privileges with respect to the site where the object is being shared. These privileges may be granted by setting a can share to site B 804 permission for site A 802. Users of site A 802, such as site Administrators for site A 802, may be precluded from viewing the site B repository 806. Users of site A 802, such as site Administrators for site A 802, may be notified of objects shared as well as allowed to discontinue the availability of objects for reuse that they transferred. The object shared may be added to site B 804 through the execution of a share type administration.

In an embodiment, a reference to an object of site A 802 is stored in the site repository 808 for site A 802. The object of site A 802 may be shared indirectly or made available for reuse by site B 804, through the execution of a share type administration. The share type administration may include storing, in a system repository 810, a reference to the object of site A 802. The object made available for reuse by site B 804 may be shared with site B 804 by executing another share type administration. This share type administration may include storing in the site B repository 806, a second duplicate of the reference to the object for the object of site A 802. The execution of a share type administration may require that the site performing the share type administration have can share to system privileges with respect to the system repository 810. The user performing the share type administration to add the object to the site may have can see shared privileges with respect to the site where the object is being added. This privilege may be granted by setting a can share to site B 804 performing for site A 802. Users of site A 802, such as site Administrators for site A 802, may be precluded from viewing the site B section of the shared repository 812. Users of site A 802, such as site Administrators for site A 802, may be notified of objects shared as well as allowed to discontinue the availability of objects for reuse that they transferred. The object shared may be added to site B 804 through the execution of a share type administration.

An object shared to a first site may be further directly shared to another site by the first site. In an embodiment, a duplicate reference to an object of site A 802 is stored in the site repository 806 for site B 804. The object whose duplicate reference is stored in the site B repository 806 of site B 804 may be shared directly with site C 814 through the execution of a share type administration. The share type administration may include storing, in the site C repository 816, another duplicate of the reference to the object. The execution of a share type administration may require that the site performing the type administration have can share privileges with respect to the site where the object is being shared. This privilege may be granted by setting a can share to site C 814 permission for site B 804. Users of site B 804 and site A 802, such as site Administrators for site A 802 and site B 804, may be precluded from viewing the site C repository 816. Users of site A 802 and site B 804, such as site Administrators for site A 802 and site B 804, may be notified of objects shared as well as allowed to discontinue use of shared objects. The object shared may be added to site C 814 through the execution of a share type administration.

An object share to a first site may be further indirectly shared with another site by the first site in a site context. In an embodiment, a duplicate reference to an object of site A 802 is stored in the site repository 806 for site B 804. The object of site A 802, whose duplicate reference is stored in the site repository 806 of site B 804, may be made available for reuse by site C 814, through the execution of a type administration. The type administration may include storing, in the section of the shared repository 812 for site C 814, a duplicate of the reference to the object. The object made available for reuse by site C 814 may be shared with site C 814 by executing another share type administration. This share type administration may include storing in the site C repository 816, a second duplicate of the reference to the object site A 802. The execution of a share type administration may require that the site performing the share operation have can share privileges for the shared repository 812. The user performing the share type administration to share the object to the site may have can add privileges with respect to the site where the object is being shared. These privileges may be granted by setting a can share to site C permission for site B 804. Users of site A 802 and site B 804, such as site Administrators for site A 802 and site B 804, may be precluded from viewing the site B repository 806. Users of site A 802 and site B 804, such as site Administrators for site A 802 and site B 804, may be notified of objects shared as well as allowed to discontinue the availability of objects for reuse that they transferred. The object shared may be added to site C 814 through the execution of a share type administration.

In an embodiment, an object of site A 802, whose duplicate reference is stored in the site repository 806 for site B 804, may be shared indirectly or made available for reuse by site C 814, through the execution of a share type administration. The share type administration may include storing, in a system repository 810, a duplicate reference to the object of site A 802. The object made available for reuse by site C 814 may be shared with site C 814 by executing another share type administration. This share type administration may include storing in the site C repository 816, a second duplicate of the reference to the object for the object of site A 802. The execution of a share type administration may require that the site performing the share type administration have can share to system privileges with respect to the system repository 810. The user performing the share type administration to add the object to the site may have can see shared privileges with respect to the site where the object is being added. This privilege may be granted by setting a can share to site C permission for site B 804. Users of site A 802 and site B 804, may be precluded from viewing the site C section of the shared repository 812. Users of site A 802 and site B 804 may be notified of objects shared as well as allowed to discontinue the availability of objects for reuse that they transferred. The object shared may be added to site C 814 through the execution of a share type administration.

Once a reference to an object has been stored to either the site repository of a site or the section of the shared repository of a site, a user of the site having can share privileges for another site may make available for reuse or share anyone of the objects to the other site. This chain of reuse may be performed by any user granted can share privileges and having a shared object associated with a site in which they administer. In an embodiment, objects in a chain of transfer will remain read-only.

An object shared or made available to a site may be made unavailable and unshared from the site. In an embodiment, an object shared or made available to a site may be unshared and made unavailable for reuse, respectively, through the execution of a share type administration. The share type administration may include removing a reference to the object from a repository. The repository may be a repository of the site, a share repository (see e.g., shared repository 524 shown in FIG. 5*a* and shared repository 812 shown in FIG. 8) and a systems repository (see e.g., system repository 508 shown in FIG. 5*a* and system repository 810 shown in FIG. 8). For example, site A may discontinue the availability of objects transferred to site B for reuse by site A. The availability of objects for reuse by a site and sharing of objects may be discontinued despite the can add privileges of a site. For example, availability of an object is discontinued by executing a share type administration to remove a reference to an object from a section of a shared repository for a site, even when the reference to the object has been stored in the site repository for the site. The adding of objects to a site, making of objects available for reuse by a site, sharing of objects, making of objects unavailable and unsharing of objects has no effect on administrative privileges granted to users and groups for the objects.

In an embodiment, objects shared, made available for reuse, added to a site, made unavailable for reuse and unshared may include compound objects. Compound objects, for the purposes of the invention, are objects that include child objects that are structured in a hierarchy. Compound objects include sites, menus, and pages. A site compound object includes, but is not limited to, a site, menus, pages and modules. For example, a site includes menus, the menus include pages and the pages include modules. A menu compound object includes, but is not limited to, a menu, pages and modules. A page compound object includes, but is not limited to, a page and modules.

In an embodiment, menus, pages and modules are the compound objects that may be shared recursively. Recursive sharing includes storing a reference to each child object of a compound object when a reference to the compound object is stored in a repository. For example, sharing a page including three modules to a site includes storing a reference to the page in the repository for the site as well as references to each of the three modules. In an embodiment, compound objects may be shared and made available for reuse without each child object of the compound object when a reference to the compound object is stored to a repository. For example, sharing a page including three modules to a site, but only sharing the page with two modules, includes storing a reference to the page in the repository for the site as well as references to two modules.

In an embodiment, child objects whose reference are not stored with their respective compound object will not appear with the compound object when the compound object is added to the site. For example, a menu shared with some of the pages that the menu points to, but not all of them, will appear with broken links on the menu when the menu is added to the site. Child objects not shared may be obtained for addition to the site in another manner. For example, the broken links of the menu may be customized by obtaining the non-shared pages elsewhere on Framework 100 or different pages in accordance with edit privileges that are granted over the menu. In an embodiment, sharing a compound object with a site, making a compound object available for reuse by a site and adding a compound object for use by a site includes determining whether the compound object is in a site repository for a site and determining whether the user has end-user enabled permission on the compound object.

A compound object made available for reuse by a site, shared to a site, and added to a site may be made unavailable and unshared from the site. In an embodiment, a compound object shared or made available to a site may be unshared and made unavailable for reuse, respectively, through the execution of a share type administration. The share type administration may include removing a reference to the compound object as well as references to all child objects from a repository. For example, a page with three modules made unavailable for reuse includes removing reference to the page and the reference to the three modules from the repository. In an embodiment, the removal of references to objects from a repository of objects added to a site removes the objects from the site. Child objects not shared, but obtained elsewhere, will remain available for sharing.

User groups may be shared between sites. In an embodiment, user group objects shared with a site are shared as read-only. The site that the user group object are shared with will not be able to add users to, or delete users from, this group. Permission for this group will not be modifiable. A set of users for the site may be granted privileges to modify the permissions for the group.

An object that references and uses other objects may be made available for reuse by a site, shared to a site and added to a site. The object may be made available, shared and added to a site through the execution of a share type administration. The share type administration may be a simple share and a compound share. FIG. 9 is an exemplary table illustrating objects and the objects they may reference and use. In a simple share type administration, a reference to the object that references other objects is stored in a repository. In a compound share type administration references to the object that references other objects and reference to the other objects are stored in a repository.

Permissions can be inherited via group hierarchy, shares can also be inherited via group hierarchy. This doesn't mean that shared objects will appear in multiple repositories according to hierarchy. It means that a site administrator who is higher up in the hierarchy than two other site administrator groups will be able to see and manipulate not only his/her own shares, but his/her child group's shares.

Sites may be configured to have a specific look-and-feel. The look-and-feel of a site is referred to, for purposes of the invention, as the branding for the site. Objects in a site that may have branding include pages of a site and navigational elements of a site. Branding may include a theme and a structure. A theme may be a collection of styles on a page of a site. Branding for a site may be determined, in part, by associating a theme with the site. Each style in the collection of styles may pertain to a particular template (element). A set of styles, one for each of the element, may be grouped together to form a single theme. A server administrator may specify the branding for a site, including an administration site.

In an embodiment, a theme is a permissionable and sharable object in a site. Each theme may include a system set of colors and fonts when first created. System color and font settings are displayed in the system context. Sever administrators can add additional color and font settings to themes. The additional color and font settings may be overridden for each theme on framework 100. End users may override font and color settings with their own settings on sites that apply a font/color option. A font/color option for a site may enable end users to override system font and color setting with their own fonts and colors for that particular site.

In an embodiment, a style is a JSP code fragment that controls the way a particular element is displayed. Any number of different styles may be used to display an element. Styles may be provided as style objects in administrative sites. In an embodiment, style objects are permissionable objects that can be shared between sites. Elements include, but are not limited to, a chrome, a footer, a header, navigation (site controls) and tabs (navigation). The chrome includes elements that surround the actual content of a module. For example, a module title, as well as, edit, minimize, and delete buttons are all part of the module chrome. The header includes content that typically appears at the top of a page. The site controls include buttons, links, or other elements for navigating to web pages that support other site features (such as user personalization pages). Site controls may be available in both horizontal and vertical configurations. Navigation includes navigational elements for switching between front-door pages of a site. Navigation may be available in both horizontal and vertical configurations.

In an embodiment, a structure may be the layout of elements on a page of a site. A structure may be a JSP code segment that defines the arrangement (look and feel) of elements on a particular page. A structure may contain hard-coded custom look-and-feel logic (HTML and/or JSP). In an embodiment, structures are permissionable objects that can be shared across between sites.

The types of branding employable by a site includes a site default branding, an installation default branding and a guest branding. Guest branding includes a theme and structure that may be provided to a guest user by a site allowing access to unauthenticated (not logged in) users. A guest user module set may be employed for each page in order to specify modules available to the guest users. Each guest user module set may be provided on an administrator site for a site. An administrator may modify a guest user module set for a page that the administrator has can edit/delete privileges defined by can edit/delete permission for the page.

Default branding includes a theme and structure automatically specified for a site when the site is created. Default branding may be employed in a site allowing access by UN-authenticated users where guest branding is not specified. The default branding for a site may be overridden by a site administrator of the site. Overriding default branding may be performed by specifying a new theme and a new structure for the site. Overriding of default branding includes brand for menu items on a site. A higher level chrome branding may be overridden by specifying a chrome within a site as the new chrome for the site. Installation default branding includes a theme and structure specified for a site without default site branding.

Figure 10:
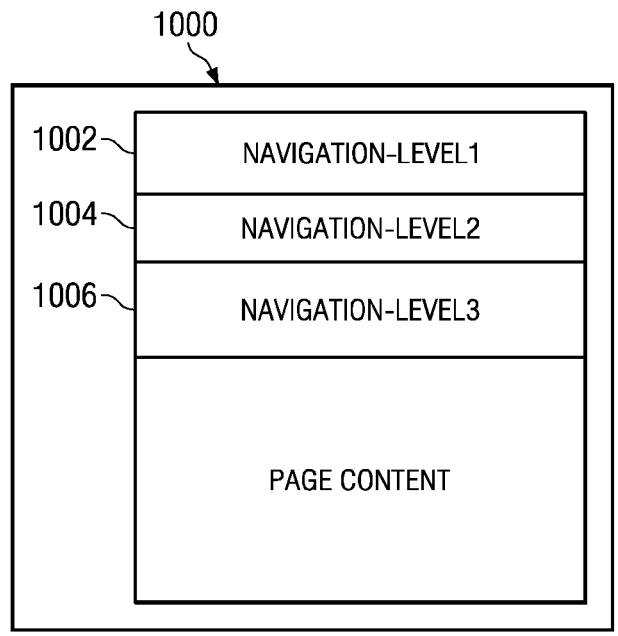
FIG. 10 is an exemplary embodiment of multi-level navigational horizontal configuration.
Figure 11:
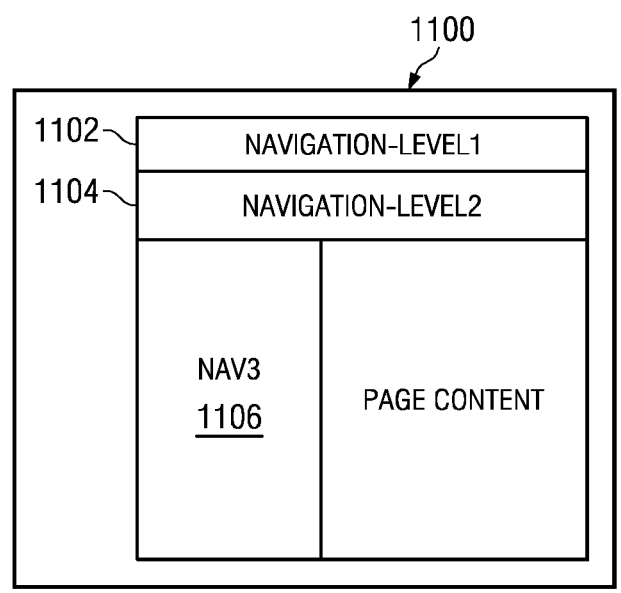
FIG. 11 is an exemplary embodiment of multi-level navigational horizontal and vertical configuration.

The branding of navigational elements for a page of a site may include a structure. In an embodiment, the structure of navigational elements includes one set of navigation elements, two sets of navigational elements, and grouping of different navigation levels into two sets. Site navigation elements may include any number of navigation levels. FIGS. 10-11 are exemplary embodiments of multi-level navigational configurations. In the FIG. 10 embodiment, a three level navigational menu 1000 is depicted with level-1 1002, level-2 1004, and level-3 1006 each configured horizontally. In the FIG. 11 embodiment, a three level navigational menu 1100 is depicted with level-1 1102 and level-2 1104 each configured horizontally and level-3 1106 configured vertically.

The structure component of a branding may contain two distinct navigation elements. One of the two distinct navigation elements may render one set of menus on a page and the second of the two navigation elements may render a second set of menus on a page, as will be discussed in detail herein below. The structure component determines the set of menus rendered by a navigation element. A site administrator may specify the menu levels to be rendered by a plurality of navigational elements in a site having a plurality of menu levels.

For example, in circumstances involving two navigation elements, a site administrator may specify the first and second menu levels to render employing a first navigation element and the third level through the fifth level to render employing a second navigation element. The first navigation element will render menu levels 1-2 and the second navigation element will render menu levels 3-5.

Alternatively, a site administrator may specify the menu levels to render employing a navigational element in a site having a plurality of menu levels. For example, in circumstances involving one navigation element, a site administrator may specify the second menu level to render employing by the navigational element, when a first menu level is grouped in a first subset and the remaining levels are grouped in a second subset. The navigational element will render the second menu level and the remaining levels in the second subset.

Branding may be included on an administration site. The branding on an administration site may be specified in a system context of an administration site. Server administrators may set the branding for the administration site. There may be an "allow referring sites to override admin site branding" option, which is a system-wide setting that controls whether or not the administration site's look- and feel will change based on a referring site's look-and-feel. The sub-section of the system admin site that controls these branding settings must ALWAYS be accessible in the event that the admin site's branding fails for some reason. (The "Diag" sub-section should also always be accessible, regardless of potential branding deployment problems.)

Figure 12:
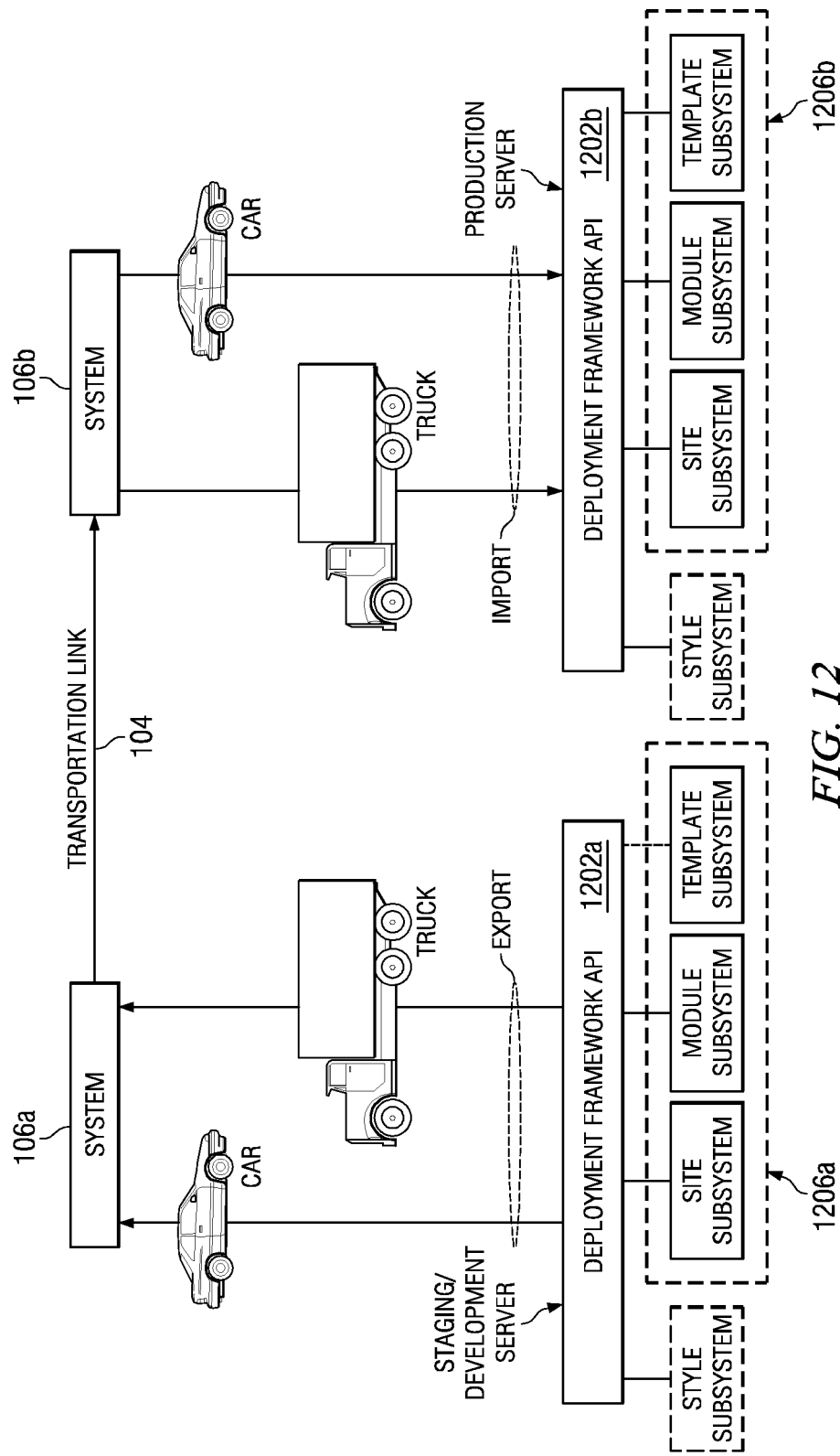
FIG. 12 is an exemplary diagram illustrating a deployment management framework for importing and exporting components of a site for between portals employed by Framework 100.

FIG. 12 is an exemplary diagram illustrating deployment management for importing and exporting components of a site between portals employed by framework 100. Deployment management may be implemented by a deployment management API 1202 within software 314. Deployment management may include importing and exporting components of a site. Components of a site may include assets of objects in association with the site, such as modules as well as elements that define the look, feel and navigation. Assets of an object include non-file assets and file assets.

A component may be exported through a deployment type administration. Deployment type administration to export a component may include designating a component for export employing a graphical user interface. An administration site may provide the graphical user interface. In an embodiment, multiple components may be simultaneously designated for export including, but not limited to, components corresponding to an entire site. Components may be exported between systems over a network 1204 employing techniques to transfer files, such as FTP. In an embodiment, components may be exported between systems by transfer to a computer readable medium.

Deployment management API may employ a set of subsystems 1206 for a site. Each of the subsystems is configured to manage a type of component associated with the site. In the FIG. 12 embodiment, the set of subsystems for a site includes a site subsystem, a module subsystem, a template subsystem and a style subsystem. Deployment management API may query subsystems to identify components. A subsystem may identify components for which the subsystem is configured to manage. For example, module subsystem may be queried to identify modules that have been associated with the particular site.

Each subsystem may collect assets, such as file assets and non-file assets, of each component they identified. In an embodiment, the non-file assets may be constructed as an extensible markup language fragment, such as an XML fragment, having a predetermined structure. The extensible markup language fragment may contain the descriptor ID of identified components and the ID of the subsystem that identified the component. In an embodiment, each subsystem collects the extensible markup language and the file assets for the components they identified. In an embodiment, the extensible markup language and file assets collected by each subsystem are grouped together.

Figure 13:
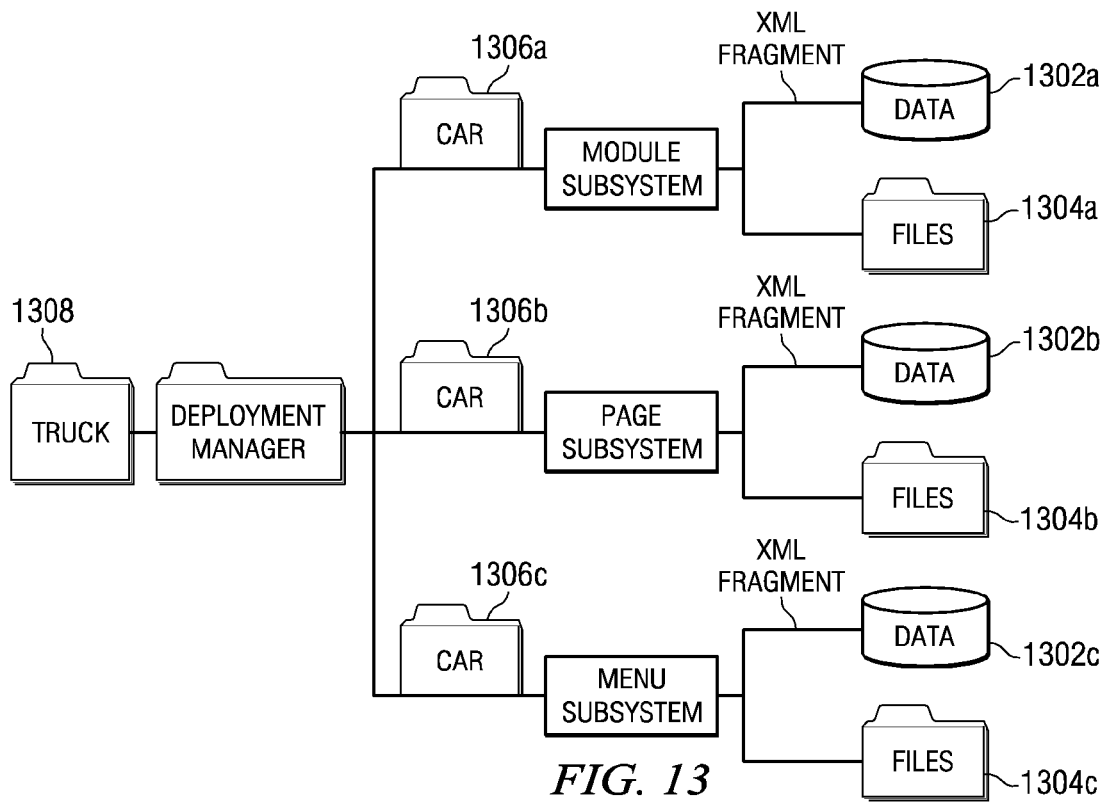
FIG. 13 depicts an exemplary collection of extensible markup language and the file assets stored as individual export files.

The extensible markup language and the file assets collected by a subsystem may be stored as an individual file. FIG. 13 depicts an exemplary collection of extensible markup language 1302 and the file 1304 assets stored as individual export files. The individual export files may be component archive (CAR) files 1306. In the FIG. 12 embodiment, CAR files may include a page CAR file, a module CAR file and a menu CAR file. Individual CAR files may be collected and stored as a group export file. In an embodiment, the group export file (TRUCK) 1308 is a file ready for transport in a zip format. Export files may be transmitted over a network to a remote system employing a file transfer protocol, such as FTP. In an embodiment, export files may be transferred employing a computer readable medium.

Export files may be imported by a remote system. The export files may be imported through a deployment type administration. Deployment type administration may include designating an export file employing a graphical user interface provided by an administrative site. The export file may be anyone of a CAR file or a TRUCK file. In an embodiment, designation of a TRUCK file generates the extraction of each CAR file in a TRUCK file. Extensible markup language for each CAR file may be examined to determine descriptor IDs included within the extensible markup language. Based on the descriptor IDs, components may be identified. The components may be extracted to the appropriate location in a file system of the portal. The XML fragment is then parsed and the objects contained therein are instantiated in the database or other relevant location.

Navigation within a site may be hierarchical where a navigable item contains a navigable item. Navigable items include a page, a site, a uniform resource locator, a navigation level and a JSP include file. Navigation within a site may be an arbitrary hierarchical ordering of menu items that are arranged into distinct levels. A site navigation for a site may grow or shrink arbitrarily. The growth and shrinkage of a site navigation is dependent on the construction of the site navigation by an administrator, such as site or server. For example, an administrator may construct a site navigation with 2 items but may modify the site navigation to 3 items. In an embodiment, each menu item is a navigable link to anyone of the navigable items.

A navigable link may be associated with a title. In an embodiment, each menu item is associated with one link and title despite the location of the menu item. A site navigation definition may be associated with each menu item.

Figures 14, 16A:
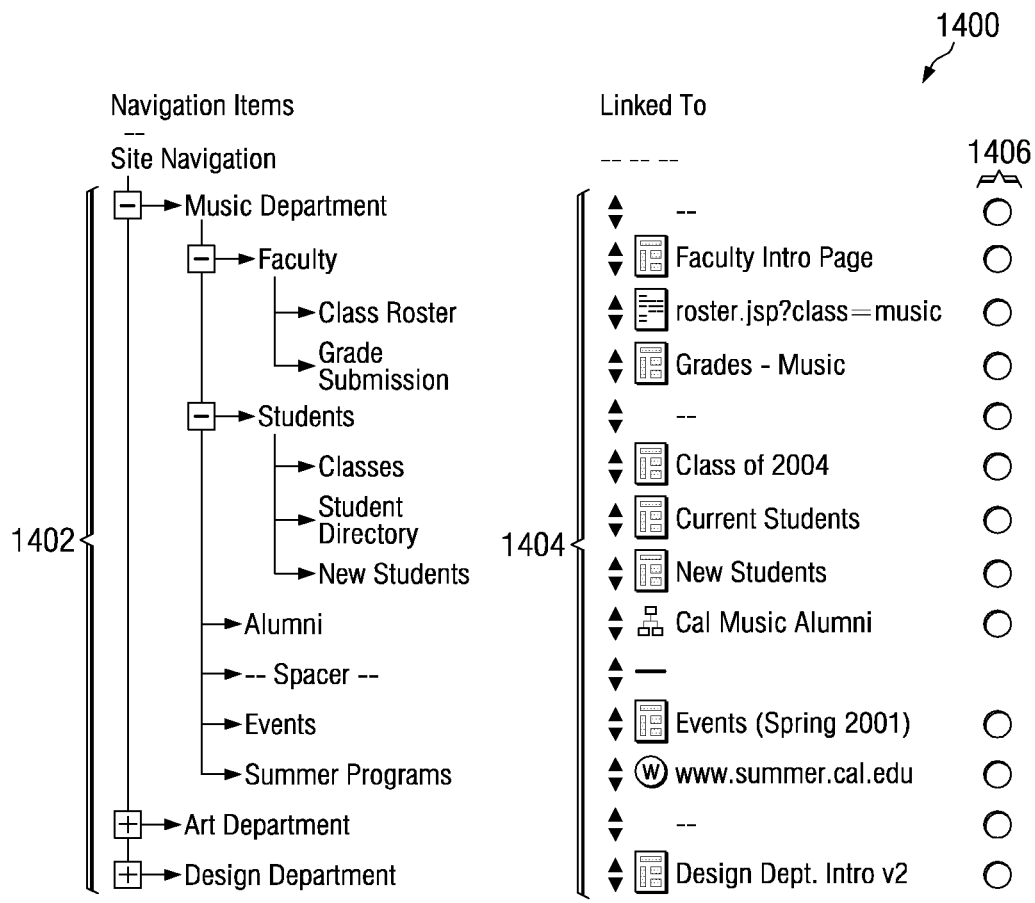
FIG. 14 illustrates menu items of menus with link titles for menu items definitions.
FIG. 16a illustrates a table for implementing the combined algorithm.

FIG. 14 illustrates menu items of menus with link titles for menu items definitions. In the FIG. 14 embodiment, menu items 1402 may link the user to the navigable item as specified by navigation definitions 1404. The menu item types include, but are not limited to, link-out type menu items and contained type menu items. In an embodiment, a link-out menu item is one in which the link that is specified causes a redirect out of a particular site. For example, menu items that refer to URLs or other sites are link-out menu items. In an embodiment, a contained menu item is one in which the link that is specified navigates to a page within the site. For example, a menu item containing a link to a page or a JSP include file is a contained menu item. Contained menu items cause a page within a site to be displayed. So contained menu items are the only kind of menu items that can be branded.

Figure 15:
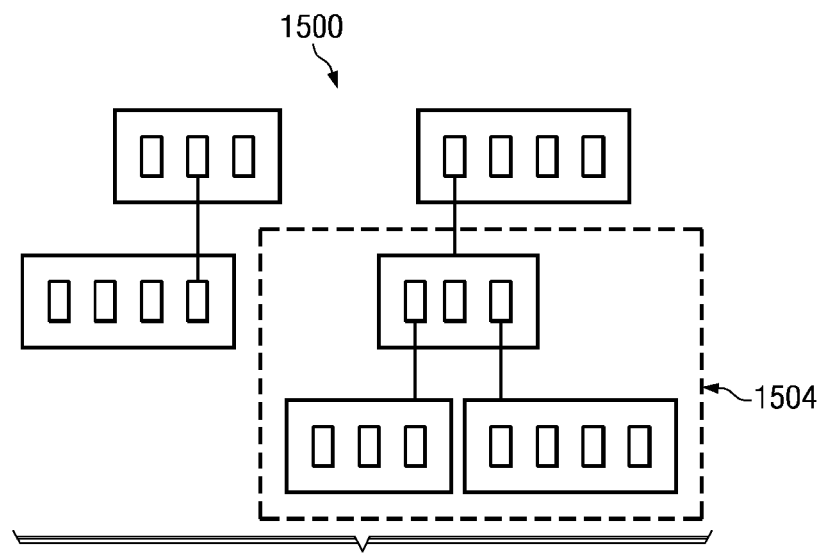
FIG. 15 illustrates a segment of a site navigation captured as a menu object.

Site navigation may be edited through an edit navigation type administration. A site administrator having can edit site navigation privileges for the site employing the site navigation may perform the edit navigation type administration. The site administrator may be granted the privilege by having the can edit site navigation permissions set. Segments of a site navigation may be captured as a menu object. A menu object is a permissionable and sharable object. FIG. 15 illustrates a segment of a site navigation captured as a menu object. In the embodiment of FIG. 15, a segment 1502 of site navigation 1500 is selected. The selected segment may be saved as a menu object.

Returning briefly to FIG. 14. The segment of site navigation may be selected employing radial button 1406. Selection of a radial button selects the menu item and sub-menu items for the menu item as the segment. The menu object may be shared, made available and added to other sites in the system in order to recreate the segment of the site navigation on the other sites as a menu of part of a menu. In an embodiment, pages referenced by a menu object shared to a site are also shared to the site. Modification to a site navigation employing the menu object may not affect the segment of the site navigation from which the menu object originated.

As a permissionable object a menu object may be enabled or disabled based on privileges granted a group viewing the site employing the menu object. In an embodiment, menu items are modified based on the privileges granted to the group to which a user is a member. In an embodiment, a menu item contained within a menu provides permissioning in a site context. Permissions for a menu item may include can edit per-site visibility and can edit settings. Visible permission over a menu may grant a site administrator privileges to use that menu in a site navigation. Edit/delete permission may grant an administrator privileges to arbitrarily edit or delete the menu. Can Edit Per-Site Branding permission is a per-site privilege that may allow an admin to override the per-site branding on menu items contained in the menu.

The algorithm employed to render menus of a site may be selected through a menu presentation type administration. The algorithms to render a menu include a combined and an exclusive. In an embodiment, the default mode for rendering menus employs the combined algorithm. A site administrator having privilege to edit menu presentation mode for a site may perform the selection of the algorithm employed by the site.

FIG. 16a illustrates a table for implementing the combined algorithm. In the FIG. 16a embodiment, the combined algorithm provides a user access to menus based on the privileges granted to the user due to membership in groups. In the embodiment of FIG. 16a, table 1600a includes menu items 1602a-1602e and groups including an everyone group 1604, a sales group 1606, a marketing group 1608 and an engineering group 1610 for a site. Application of the Combined algorithm to a user having membership in the sales group 1606 and a marketing group 1608 provides the user with access to Menu Items 1602a-1602c and 1602d. As a result of all users in framework 100 being members of the everyone group, the user is provided access to menu items 1602a-1602b.

Figures 16B, 18:
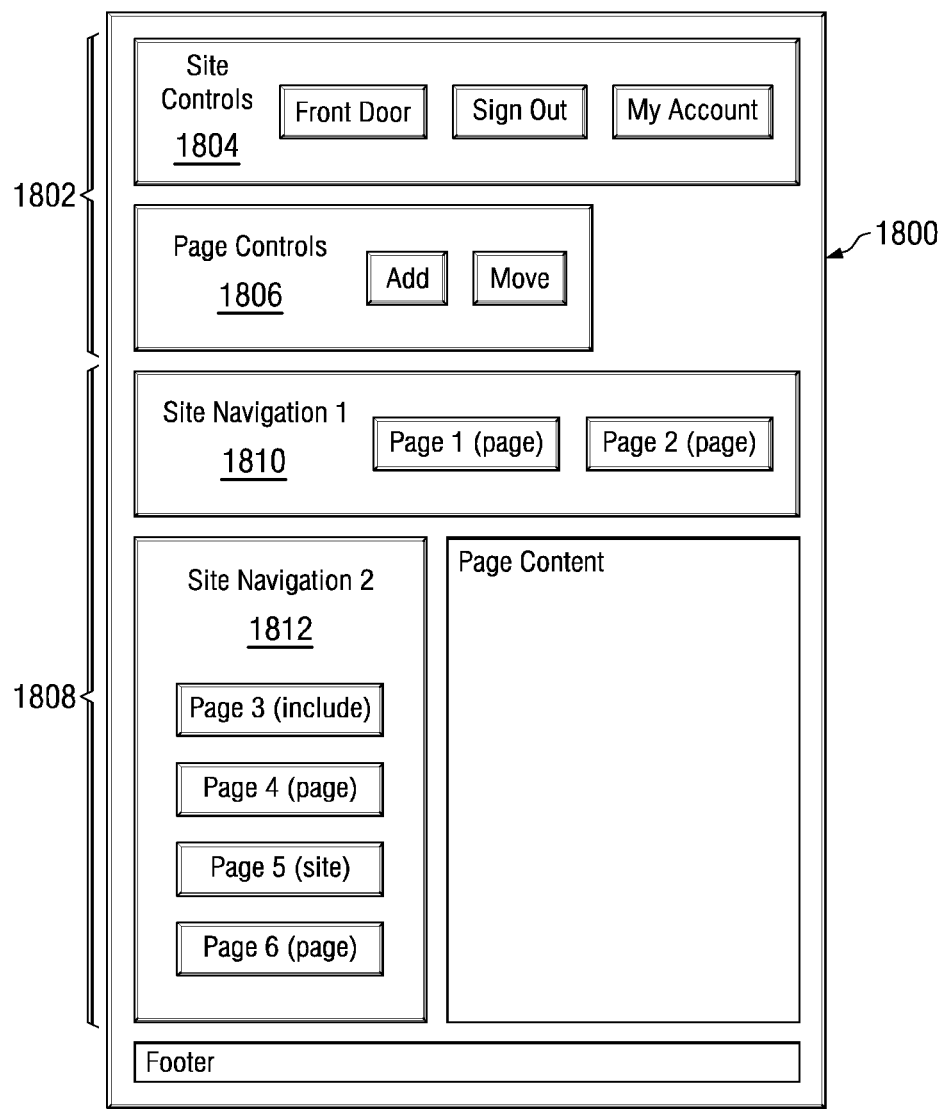
FIG. 16b illustrates a table for implementing the exclusive algorithm.
FIG. 18 depicts an exemplary embodiment of a front door page of an end user site employing menuing structures.

FIG. 16b illustrates a table for implementing the exclusive algorithm. FIG. 16b is best understood when viewed in combination with FIG. 16a. In the FIG. 16b embodiment, the exclusive algorithm provides a user access to menus based on a priority level assigned to groups by a site administrator. In the embodiment of FIG. 16b, table 1600b includes groups 1606-1610 that have been assigned priority levels, where the menu item for the engineering group 1610 has priority over menu items for both marketing group 1608 and sales group 1606 and marketing group 1608 has priority over sales group 1606. Application of the exclusive algorithm to a user having membership in the engineering group 1610 and the sales group 1606 provides the user with access to menu items 1602a-1602b and 1602d illustrated in FIG. 16a. In an embodiment, menu items enabled for the everyone group are provided to all users for access and the menu item for the group having the highest priority to which the users is a member is also provided.

A site navigation for a site may use any number of menus. The site administrator of a site employing menus in its site navigation can select one of the menus as a top level locking menu.

Figure 17:
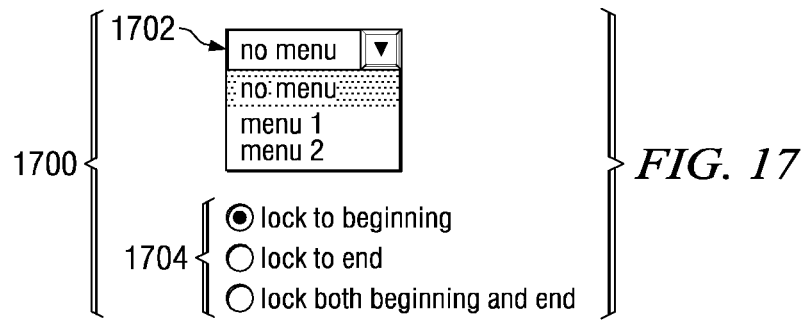
FIG. 17 depicts an exemplary embodiment of a top level locking interface.

FIG. 17 depicts an exemplary embodiment of a top level locking interface. In the FIG. 17 embodiment, the top level locking interface includes drop down menu 1702 and radial buttons 1704. Drop down menu 1702 may provide an administrator with menus of a site. Radial button may provide an administrator with the ability to specify where the menu selected by drop down menu 1702 may be locked. A Menu may be locked to the beginning, the end as well as the end and beginning of the top level for a site navigation. Locking at both the beginning and the end of the top level means that the first level of navigation will be comprised solely of this menu.

FIG. 18 depicts an exemplary embodiment of a front door page of an end user site employing menuing structures according to the invention. In the FIG. 18 embodiment, front door page 1800 employs a control menu system 1802 and site navigation menu system 1808. Control menus system include, but are not limited to, site controls 1804 and page controls 1806. Site controls 1804 may be rendered by a site controls style. Site controls 1804 may include links to pages, such as Front Door and My Account. Page controls 1806 may be rendered by a page controls style. Page controls 1806 may include links to pages, such as add and move, and any other page-aware end-user pages except the front door. Site navigation 1808 may be rendered by one or more site navigation styles. Site navigation 1808 styles may include navigation links to Pages and JSP pages including files. The state of any particular page can be defined at any time by parameters including a selected control menu tab and a selected navigation menu item. The selected control menu tab defines which control menu tab is selected. The selected navigation menu item defines which site navigation menu item is selected.

Figure 19:
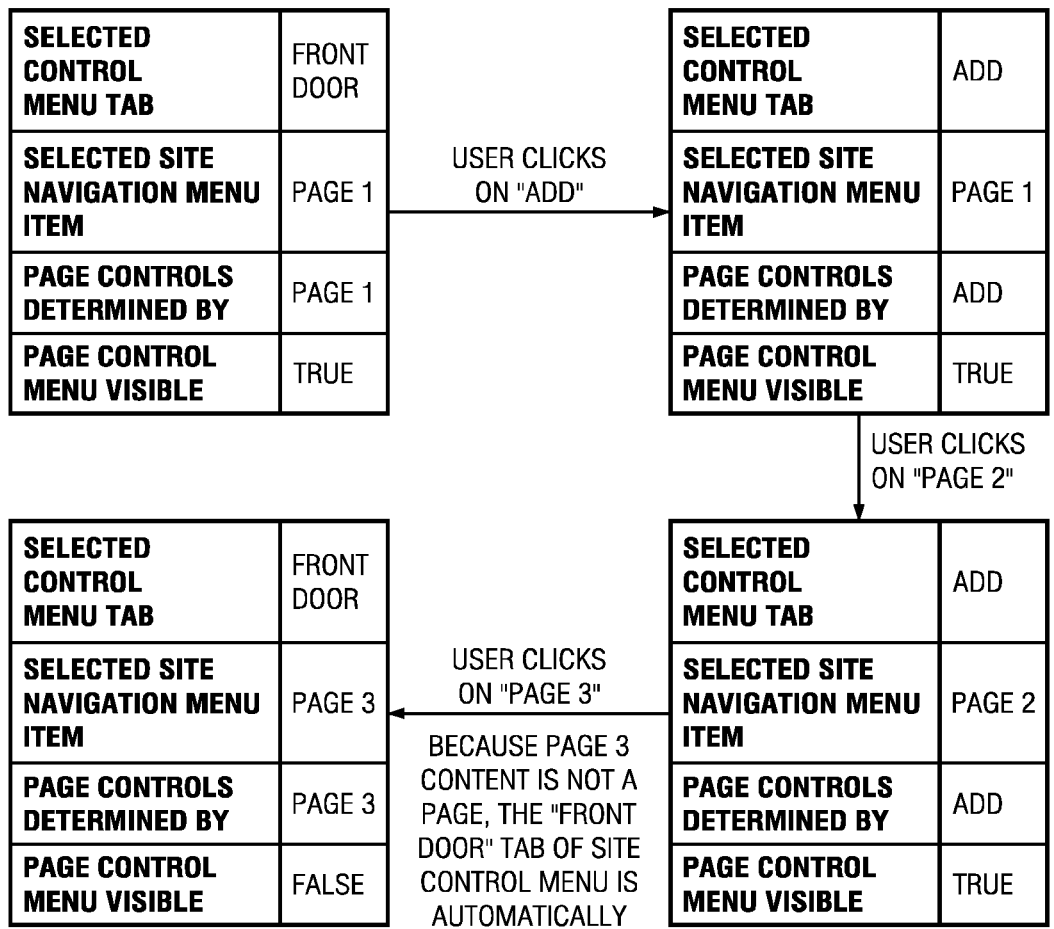
FIG. 19 depicts the rules determining the operation of the control menu system and a site navigation system according to an embodiment.

FIG. 19 depicts the rules determining the operation of the control menu system and a site navigation system according to an embodiment. In the embodiment of FIG. 19, the page controls menu is rendered if the selected navigation menu item refers to the content type page. The page content of a page may be determined by the selected control menu tab. In an embodiment, the Page Content of the page is determined by the Selected Navigation Menu Item when the selected control menu tab has a link type front door. The branding of a page may be determined by the Selected Navigation Menu Item. In an embodiment, selection of a menu item from the Page Control menu followed by selection of a menu item from the Site Navigation Menu not linked to a Page object automatically selects the Front Door link on the Site Control Menu. The content associated with a Menu Item is displayed in the Page Content area based on the menu item selected on the site navigation menu.

An object of a site may be locked down to prevent modification of the object. The object may be locked down through the execution of a share type administration. In an embodiment, users having privilege to lock down objects include a server administrator and a delegate administrator. For example, the site administrator is able to lock down the number and order of pages in the site and most of the modules for each page except the first. The Site Administrators for the site, who are employees of another company, are able to change the site's branding and create several new modules from building blocks to go on the first page, but not the remaining pages.

End users may navigate through a site employing a site navigation tree. In an embodiment, end user will see items on the navigation tree they have been allowed to see. The end user may navigate to the given page from a navigation tree. In an embodiment, the end user will see the module instances they have been granted privileges to see once the end user has reached a page. The privileges granted to an end user may be based on permission associated with each module instance and menu item for the site. The permissions may include a system level permission and an access permission for the site. In an embodiment, only one of these has to be true for the end user to see the instance or item.

Figure 20A:
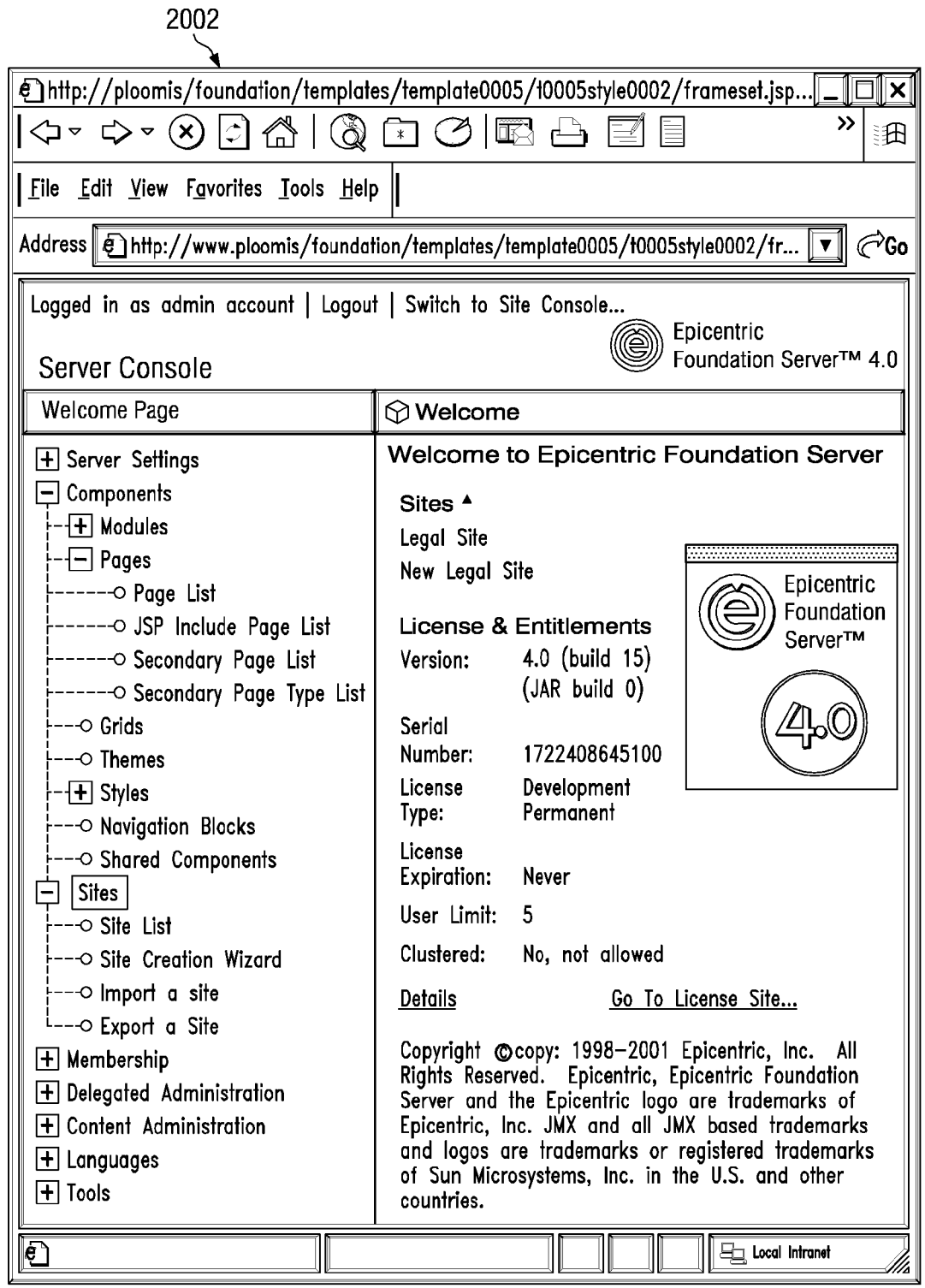
FIGS. 20a-20b are exemplary illustrations of consoles according to an embodiment.
Figure 20B:
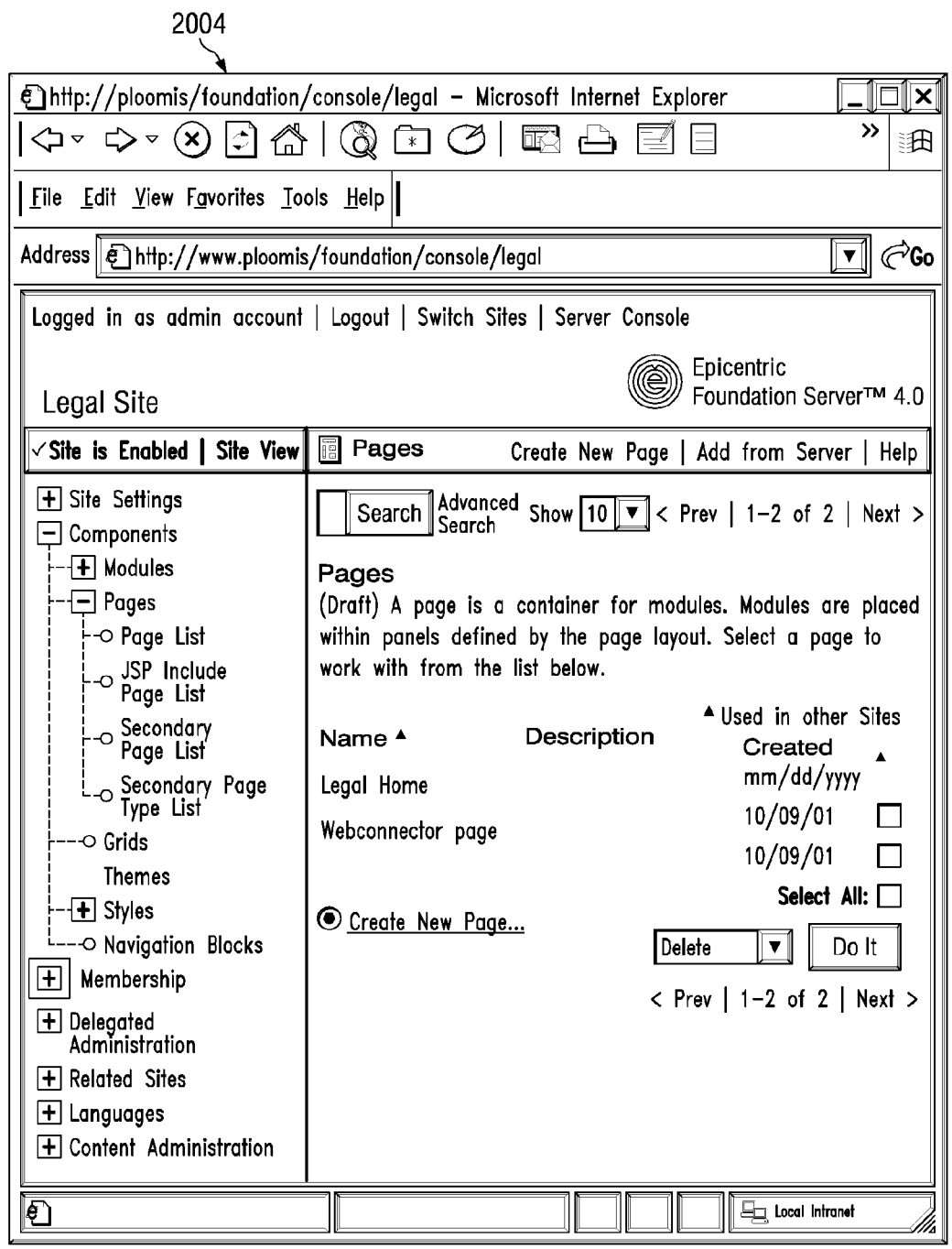

FIGS. 20a-20b are exemplary illustrations of consoles according to an embodiment. In the FIG. 20a embodiment, a server console 2002 is depicted. The server console may be employed by a server administrator to perform administration on a systems context as discussed above. In the FIG. 20b embodiment, a site console 2004 is depicted. The site console may be employed by a server administrator to perform administration on a site context as discussed above.

While specific embodiments have been illustrated and described, it will be understood by those having ordinary skill in the art that changes may be made to those embodiments without departing from the spirit and scope of the invention.

The invention claimed is:

1. A method of sharing objects between web sites, the method comprising:
    storing a reference in a first site repository for a first web site on a network,
        wherein the network comprises multiple sites, each site of the multiple sites on the network has a section in a shared repository and an associated site repository,
        wherein the storing is performed by an application server based on a first privilege granted with respect to the first web site, the application server communicatively connected to a web server and to a database management system,
        wherein the first web site comprises a first collection of objects,
        wherein the first collection of objects for the first web site is stored in the database management system, the database management system embodied on an apparatus communicatively connected to the application server, the first collection of objects given a first identity and implemented to provide a common look, feel, and navigational structure of the first web site that distinguishes the first web site from the multiple sites on the network,
        wherein the reference stored in the first site repository is associated with an object of the first collection of objects for the first web site, and
        wherein the reference contains information for accessing the object;
    executing a share type administration operation for making the object available for reuse by a second web site on the network, the share type administration operation comprising making a duplicate of the reference that is stored in the first site repository for the first web site, the share type administration operation performed by the application server; and
    storing the duplicate of the reference in a shared repository that is available to the second web site or in a second site repository for the second web site, thereby making the object available for reuse by the second web site,
   wherein the second web site comprises a second collection of objects, the second collection of objects given a second identity and implemented to provide a common look, feel, and navigational structure of the second web site that distinguishes the second web site from the multiple sites on the network.

2. The method of claim 1, further comprising:
making the object unavailable for reuse by the second web site by removing the reference from the shared repository or the second site repository.

3. The method of claim 1, further comprising:
making the object available for reuse by a third web site on the network by making and storing a second duplicate of the reference in a third site repository for the third web site.

4. The method of claim 3, wherein the storing the second duplicate of the reference in the third site repository is performed based on the first privilege granted with respect to the first web site or a second privilege granted with respect to the second web site.

5. The method of claim 1, further comprising:
making the object available for reuse by a third web site on the network by making and storing a second duplicate of the reference in a third web site section of the shared repository that is available to the third web site on the network.

6. The method of claim 5, wherein users of the first web site and the second web site are precluded from viewing the third web site section of the shared repository.

7. The method of claim 1, wherein the object is read-only by users of the second web site.

8. A computer program product having at least one non-transitory computer readable medium storing instructions translatable by a processor of an application server to perform:
   storing a reference in a first site repository for a first web site on a network,
      wherein the network comprises multiple sites, each site of the multiple sites on the network has a section in a shared repository and an associated site repository, the application server communicatively connected to a web server and to a database management system,
      wherein the storing is performed based on a first privilege granted with respect to the first web site,
      wherein the first web site comprises a first collection of objects,
      wherein the first collection of objects for the first web site is stored in the database management system, the database management system embodied on an apparatus communicatively connected to the application server, the first collection of objects given a first identity and implemented to provide a common look, feel, and navigational structure of the first web site that distinguishes the first web site from the multiple sites on the network,
      wherein the reference stored in the first site repository is associated with an object of the first collection of objects for the first web site, and
      wherein the reference contains information for accessing the object;
   executing a share type administration operation for making the object available for reuse by a second web site on the network, the share type administration operation comprising making a duplicate of the reference that is stored in the first site repository for the first web site; and
   storing the duplicate of the reference in a shared repository that is available to a second web site or in a second site repository for the second web site, thereby making the object available for reuse by the second web site,
      wherein the second web site comprises a second collection of objects, the second collection of objects given a second identity and implemented to provide a common look, feel, and navigational structure of the second web site that distinguishes the second web site from the multiple sites on the network.

9. The computer program product of claim 8, wherein the instructions are further translatable by the processor to perform:
   removing the reference from the shared repository or the second site repository, thereby making the object unavailable for reuse by the second web site.

10. The computer program product of claim 8, wherein the instructions are further translatable by the processor to perform:
    making and storing a second duplicate of the reference in a third site repository for a third web site on the network, thereby making the object available for reuse by the third web site on the network.

11. The computer program product of claim 10, wherein the storing the second duplicate of the reference in the third site repository is performed based on the first privilege granted with respect to the first web site or a second privilege granted with respect to the second web site.

12. The computer program product of claim 8, wherein the instructions are further translatable by the processor to perform:
    making and storing a second duplicate of the reference in a third web site section of the shared repository that is available to a third web site on the network, thereby making the object available for reuse by the third web site on the network.

13. The computer program product of claim 12, wherein users of the first web site and the second web site are precluded from viewing the third web site section of the shared repository.

14. A system, comprising:
   an application server communicatively connected to a web server and to a database management system, the application server having:
   a processor; and
   at least one non-transitory computer readable medium,
   the at least one non-transitory computer readable medium storing instructions translatable by the processor to perform:
   storing a reference in a first site repository for a first web site on a network,
      wherein the network comprises multiple sites, each site of the multiple sites on the network has a section in a shared repository and an associated site repository,
      wherein the storing is performed based on a first privilege granted with respect to the first web site,
      wherein the first web site comprises a first collection of objects,
      wherein the first collection of objects for the first web site is stored in the database management system, the database management system embodied on an apparatus communicatively connected to the application server, the first collection of objects given a first identity and implemented to provide a common look, feel, and navigational structure of the first web site that distinguishes the first web site from the multiple sites on the network, wherein the reference stored in the first site repository is associated with an object of the first collection of objects for the first web site, and wherein the reference contains information for accessing the object;

executing a share type administration operation for making the object available for reuse by a second web site on the network, the share type administration operation comprising making a duplicate of the reference that is stored in the first site repository for the first web site; and storing the duplicate of the reference in a shared repository that is available to a second web site or in a second site repository for the second web site, thereby making the object available for reuse by the second web site, wherein the second web site comprises a second collection of objects, the second collection of objects given a second identity and implemented to provide a common look, feel, and navigational structure of the second web site that distinguishes the second web site from the multiple sites on the network.

15. The system of claim 14, wherein the instructions are further translatable by the processor to perform:

removing the reference from the shared repository or the second repository, thereby making the object unavailable for reuse by the second web site.

16. The system of claim 14, wherein the instructions are further translatable by the processor to perform:

making and storing a second duplicate of the reference in a third repository for a third web site on the network, thereby making the object available for reuse by the third web site on the network.

17. The system of claim 16, wherein the storing the second duplicate of the reference in the third site repository is performed based on the first privilege granted with respect to the first web site or a second privilege granted with respect to the second web site.

18. The system of claim 14, wherein the instructions are further translatable by the processor to perform:

making and storing a second duplicate of the reference in a third web site section of the shared repository that is available to a third web site on the network, thereby making the object available for reuse by the third web site on the network.

19. The system of claim 18, wherein users of the first web site and the second web site are precluded from viewing the third web site section of the shared repository.

20. The system of claim 14, wherein the object is read-only by users of the second web site.

* * * * *